US007272318B2

United States Patent
Lee et al.

(10) Patent No.: US 7,272,318 B2
(45) Date of Patent: Sep. 18, 2007

(54) PASSIVE OPTICAL NETWORK EMPLOYING MULTI-CARRIER CODE DIVISION MULTIPLE ACCESS

(75) Inventors: Ki-Cheol Lee, Suwon-shi (KR); Jong-Kwon Kim, Taejonkwangyok-shi (KR); Hak-Phil Lee, InchonKwangyok-shi (KR); Jun-Ho Koh, Suwon-shi (KR); Jong-Hun Lee, Suwon-shi (KR); Tae-Sung Park, Yongin-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 589 days.

(21) Appl. No.: 10/770,370

(22) Filed: Feb. 2, 2004

(65) Prior Publication Data

US 2004/0223763 A1 Nov. 11, 2004

(30) Foreign Application Priority Data

May 6, 2003 (KR) ...................... 10-2003-0028716

(51) Int. Cl.
*H04J 14/08* (2006.01)
(52) U.S. Cl. .......................................... 398/78; 398/67
(58) Field of Classification Search ............ 398/77–78, 398/66–67
See application file for complete search history.

(56) References Cited

U.S. PATENT DOCUMENTS

| 6,697,374 | B1 * | 2/2004 | Marmur et al. | 370/458 |
| 6,785,558 | B1 * | 8/2004 | Stratford et al. | 455/561 |
| 6,925,263 | B2 * | 8/2005 | Horne | 398/154 |
| 2003/0133460 | A1 * | 7/2003 | Lee et al. | 370/395.43 |
| 2004/0105434 | A1 * | 6/2004 | Baw | 370/355 |
| 2005/0141539 | A1 * | 6/2005 | Hamilton et al. | 370/432 |

FOREIGN PATENT DOCUMENTS

JP 2004-221641 8/2004

* cited by examiner

*Primary Examiner*—Leslie Pascal
(74) *Attorney, Agent, or Firm*—Cha & Reiter, LLC

(57) ABSTRACT

A passive optical network (PON) for providing a large amount of data at high speed to subscribers is provided. In particular, a PON employing a multi-carrier CDMA in which a CDMA method is applied for an upstream signal is provided. The PON employing a multi-carrier CDMA includes: optical network terminals (ONTs) for transmitting CDMA-based data using multiple carriers to an optical line terminal (OLT) and for receiving Ethernet-based data transmitted from the OLT; the OLT for transforming CDMA-based data received from the ONT into Ethernet-based data, for transmitting the Ethernet-based data to a higher network, and for transmitting Ethernet-based date to the ONTs; and an optical coupler for coupling CDMA-based optical signals transmitted from the ONTs, for transmitting the coupled optical signal to the OLT, and for distributing an Ethernet-based optical signal transmitted from the OLT to the ONTs.

20 Claims, 24 Drawing Sheets

PASSIVE OPTICAL NETWORK EMPLOYING MULTI-CARRIER CODE DIVISION MULTIPLE ACCESS

CLAIM OF PRIORITY

This application claims priority to an application entitled "Passive optical network employing multi-carrier code division multiple access," filed in the Korean Intellectual Property Office on May 6, 2003 and assigned Serial No. 2003-28716, the contents of which are hereby incorporated by reference.

BACKGROUND OF THE INVENTION

1. Field of the Invention

The present invention relates to a passive optical network (PON) for providing a large amount of data at high speed to subscribers.

2. Description of the Related Art

Currently, data service is mostly provided to internet service subscribers through xDSL (Digital Subscriber Line) (ADSL, VDSL), cable modems, dial-up modems, etc., at speeds of 56 kbps and higher. However, in order to provide various services henceforth—such as large quantities of visual information service, real-time VoD (Video on Demand) service, high quality broadcasting service, and so forth—to subscribers, a data transmission speed of about 100 Mbps is required. Thus, it is impossible to provide the services using existing telephone lines, UTP cables, etc. To address this need, the necessity of construction of optical subscriber network using optical communication is increasing rapidly. A passive optical network (PON) has been suggested and is being developed as a new economical way of forming an optical subscriber network.

The PON comprises at least one OLT (Optical Line Terminal), a plurality of ONUs (Optical Network Units) or ONTs (Optical Network Terminals), and a passive optical coupler. Such PONs have largely been classified into ATM-PONs (Asynchronous Transfer Mode-PONs), Ethernet PONs, and WDM-PONs (Wavelength Division Multiplex-PONs), according to their implementation methods. Further, a new research in the area of CDMA-PON employing CDMA is growing.

FIG. 1a to 1d are schematic views illustrating the general constructions of PON systems according to the prior art.

First, FIG. 1a shows a schematic view of an ATM-PON employing an ATM (Asynchronous Transfer Mode), in which an upstream communication is performed with the transmission of ATM cells at a wavelength of 1310 nm at 155 Mbps and a downstream communication is performed with the transmission of ATM cells at a wavelength of 1550 nm at 155/622 Mbps.

FIG. 1b shows a schematic view of an Ethernet PON employing an Ethernet mode according to the prior art, which has the same upstream and downstream wavelengths as those of the ATN-PON, but uses Gigabit Ethernet signals of 1.25 Gbps for both upstream and downstream signals. Also, the ATM PON uses cells of fixed length, while the Ethernet PON uses Ethernet frames having variable length.

FIG. 1c shows a schematic view of a WDM-PON employing a WDM (Wavelength Division Multiplex) according to the prior art. As shown, the wavelengths used for transmission and receptions are assigned to each ONU individually. Therefore, the WDM-PON uses wavelength multiplexer/demultiplexers not as a passive optical coupler as in the ATN-PON and the Ethernet PON.

Finally, FIG. 1d shows a schematic view of an optical subscriber network employing CDMA (Code Division Multiple Access) technology for both upstream and downstream communications, in which the transmission speed of upstream and downstream data is about 10 Mbps.

The ATM-PON and the Ethernet PON of the prior art use TDM (Time Division Multiplexing) technology for downstream communication and TDMA (Time Division Multiple Access) technology for upstream communication. In the case of the downstream signals, data are transmitted according to a broadcasting method to avoid signal collisions. However, in the case of the upstream signals, the same wavelength is used when two or more ONUs or ONTs transmits their signals to an OLT simultaneously, so that signal collisions may be caused in the passive optical coupler. Therefore, the ATM-PON and the Ethernet PON have to use a very complicated MAC (Media Access Control) protocol in order to address this problem.

In addition, as the distances between the OLT and each ONU or ONT are different from each other, various optical signals of different strengths are inputted into an optical receiver in the OLT. As such, a BMIC (Burst Mode IC) is required to receive the various optical signals in stabilization. Also, an optical transmitter in each ONU or ONT requires a BMIC capable of operating the transmitter only in the case of signal transmission.

As described above, the ability of the ATM PON and the Ethernet PON to receive a guaranteed bandwidth is largely restricted.

Meanwhile, in the case of the WDM-PON, since a MAC is not used, operation of the PON system is simpler, and a broad bandwidth transmission can be guaranteed; however, it is difficult to produce optical transmitter/receiver modules at a low cost. As a result, continuous studies and development have been made to produce economical optical transmitter/receiver modules.

Lastly, in the case of the conventional optical subscriber network employing CDMA, the use of a MAC is not required as CDMA scheme is applied to upstream communication. However, since the CDMA technology is also used for downstream communication in the optical subscriber network, the construction of the ONU or ONT and the OLT is complicated, thereby increasing the manufacturing cost. Further, in the conventional optical network employing CDMA, a switch in the OLT must divide data according to each subscriber before the transmission of the data, thereby complicating the operation of the OLT.

SUMMARY OF THE INVENTION

Accordingly, the present invention has been made to solve the above-mentioned problems occurring in the prior art and provides additional advantages, by providing a passive optical network (PON) employing a multi-carrier CDMA (Code Division Multiple Access) in which a CDMA method is applied for an upstream signal.

One aspect of the present invention is to provide a PON capable of providing a large quantity of data at a high speed to subscribers by using Gigabit Ethernet signals like an Ethernet PON for downstream signals, while using CDMA technology for upstream signals. As a result, the use of the complicated MAC is not required.

Another object of the present invention is to provide a PON employing a multi-carrier CDMA instead of the conventional DS (Direct Sequence) CDMA, so that a low-speed electronic circuit of 100 Mbps, in lieu of a high-speed electronic circuit of 1.6 Gbps or a 3.2 Gbps, is used. As such, the signal process in a transmitter and a receiver is greatly simplified, while solving a synchronization problem.

In embodiment, a passive optical network (PON) employing a multi-carrier CDMA is provided and includes: optical network terminals (ONTs) for transmitting CDMA-based data using multiple carriers to an optical line terminal (OLT) and for receiving Ethernet-based data transmitted from the OLT; the OLT for transforming CDMA-based data received from the ONT into Ethernet-based data and transmitting the Ethernet-based data to a higher network, and for transmitting Ethernet-based date to the ONTs; and an optical coupler for coupling CDMA-based optical signals transmitted from the ONTs and transmitting the coupled optical signal to the OLT, and for distributing an Ethernet-based optical signal transmitted from the OLT to the ONTs.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENT

Figure 1A:
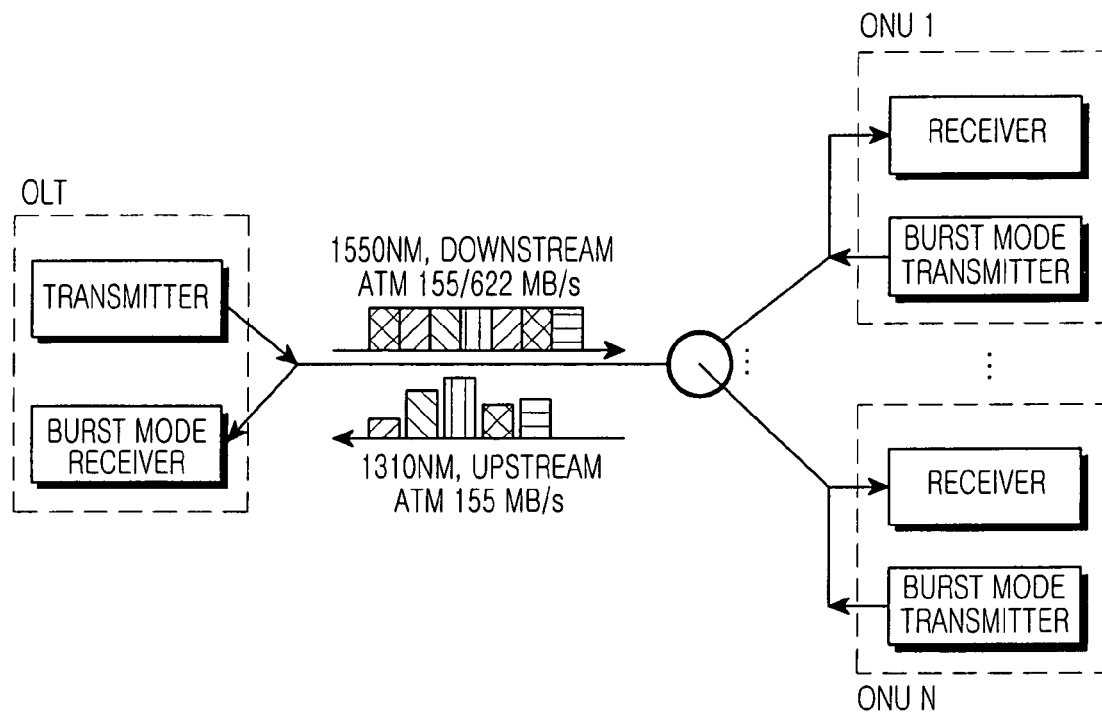
FIG. 1a to 1d are schematic views illustrating general constructions of PON systems according to the prior art.
Figure 1B:
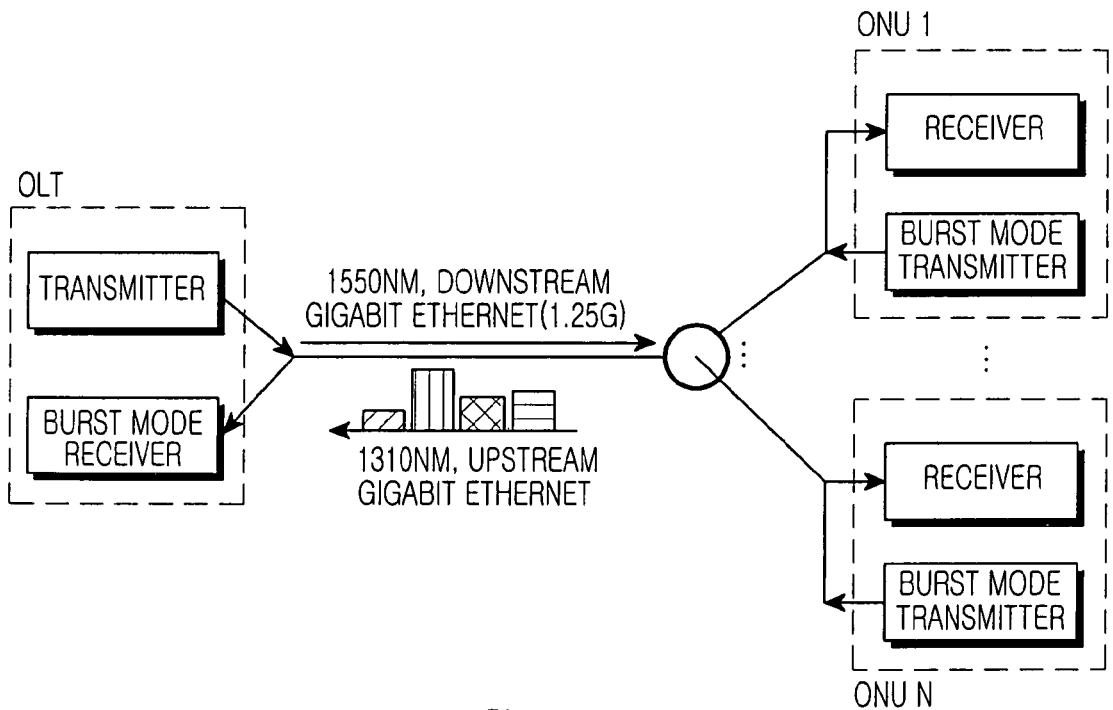
Figure 1C:
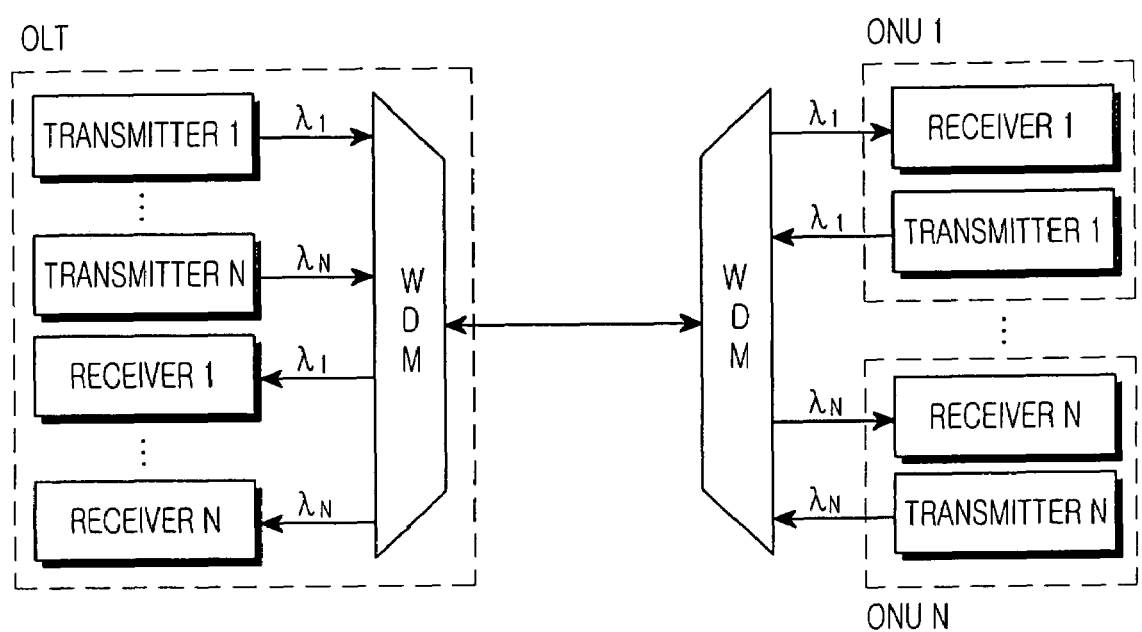
Figure 1D:
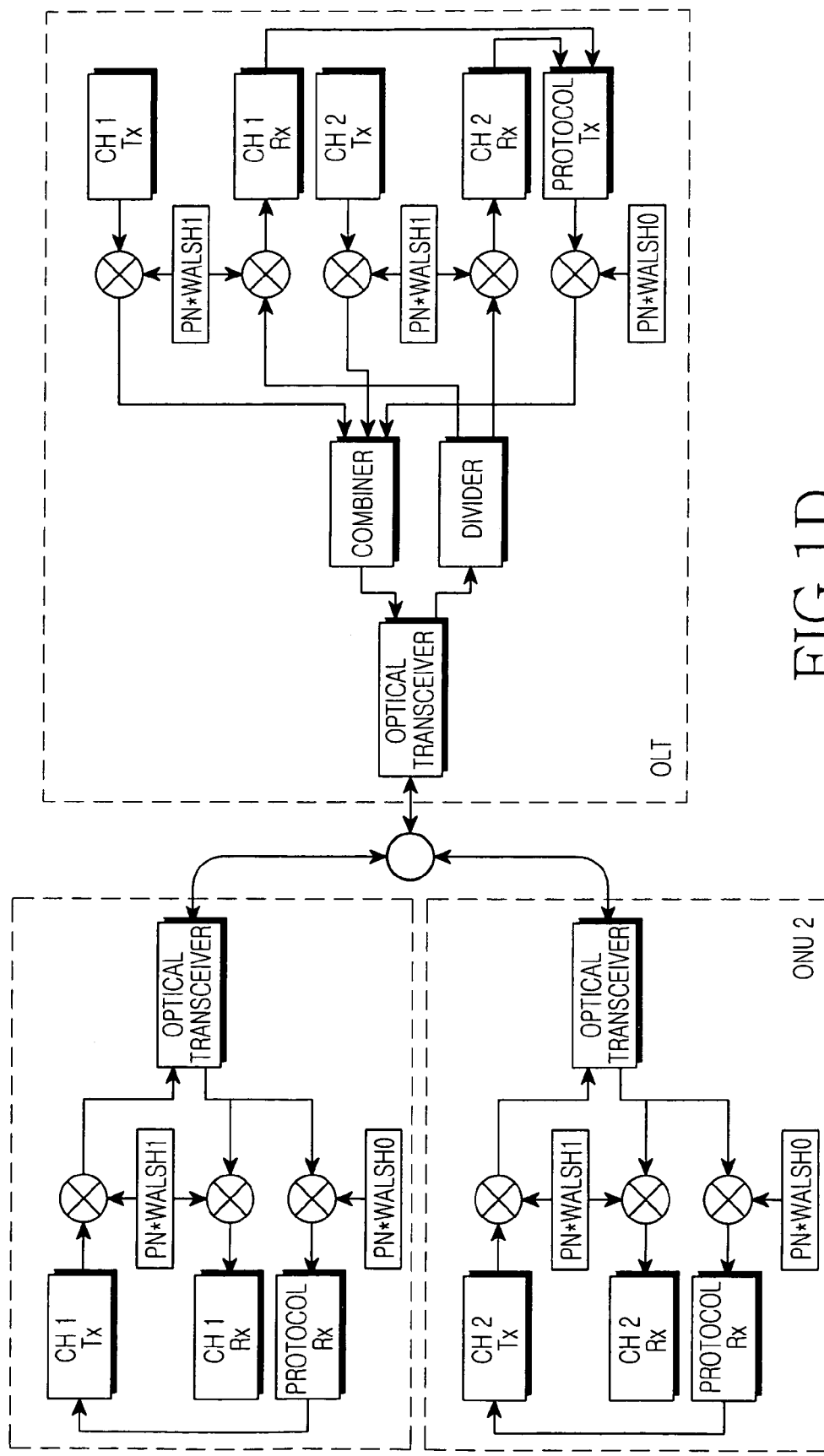

Hereinafter, a passive optical network employing a multi-carrier code division multiple access according to preferred embodiments of the present invention will be described with reference to the accompanying drawings. It is to be noted that the same elements are indicated with the same reference numerals throughout the drawings. For the purposes of clarity and simplicity, a detailed description of known functions and configurations incorporated herein will be omitted as it may make the subject matter of the present invention unclear.

Figure 2A:
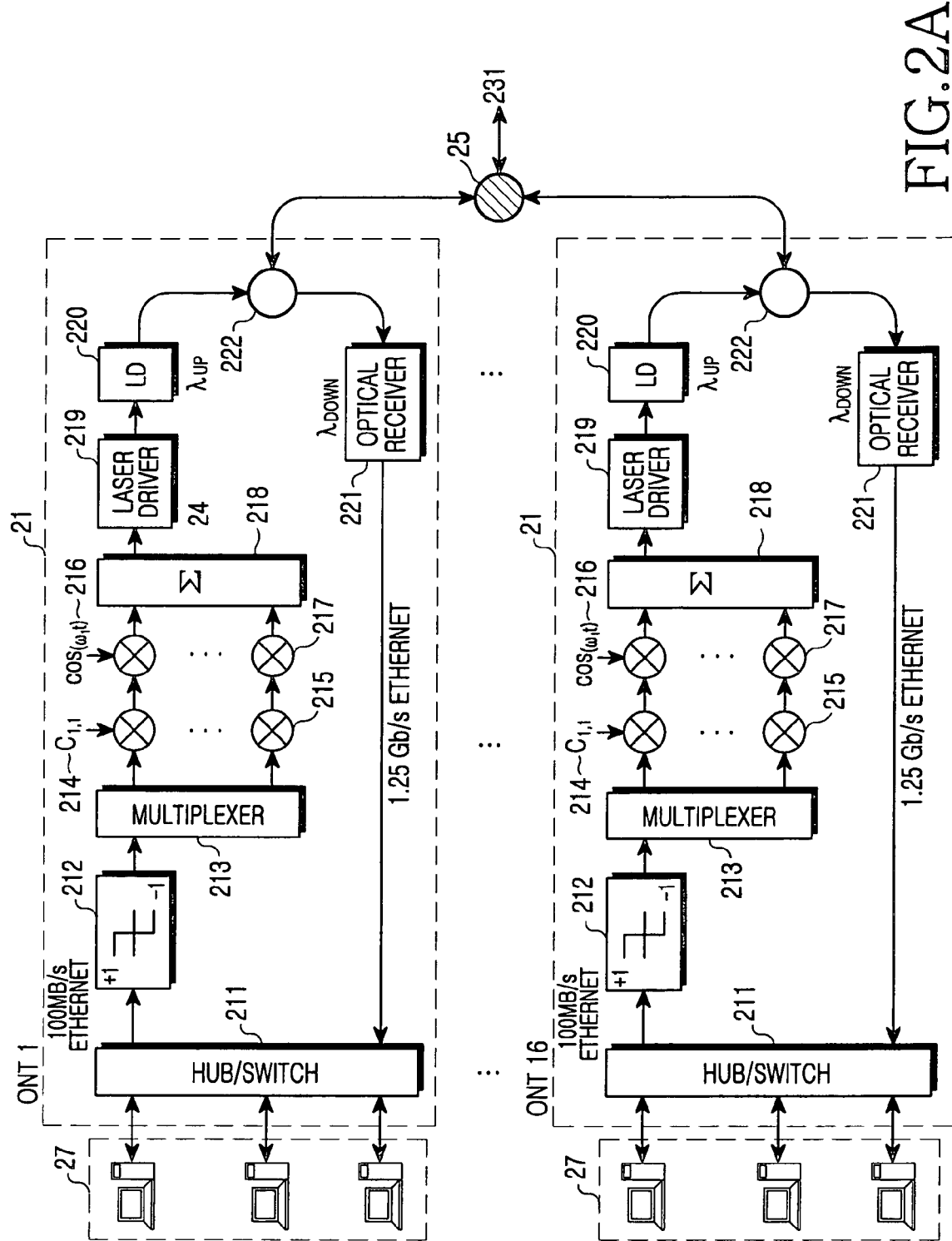
FIGS. 2a and 2b illustrate a PON employing a multi-carrier CDMA in which a CDMA method is applied for an upstream signal according to an embodiment of the present invention.
Figure 2B:
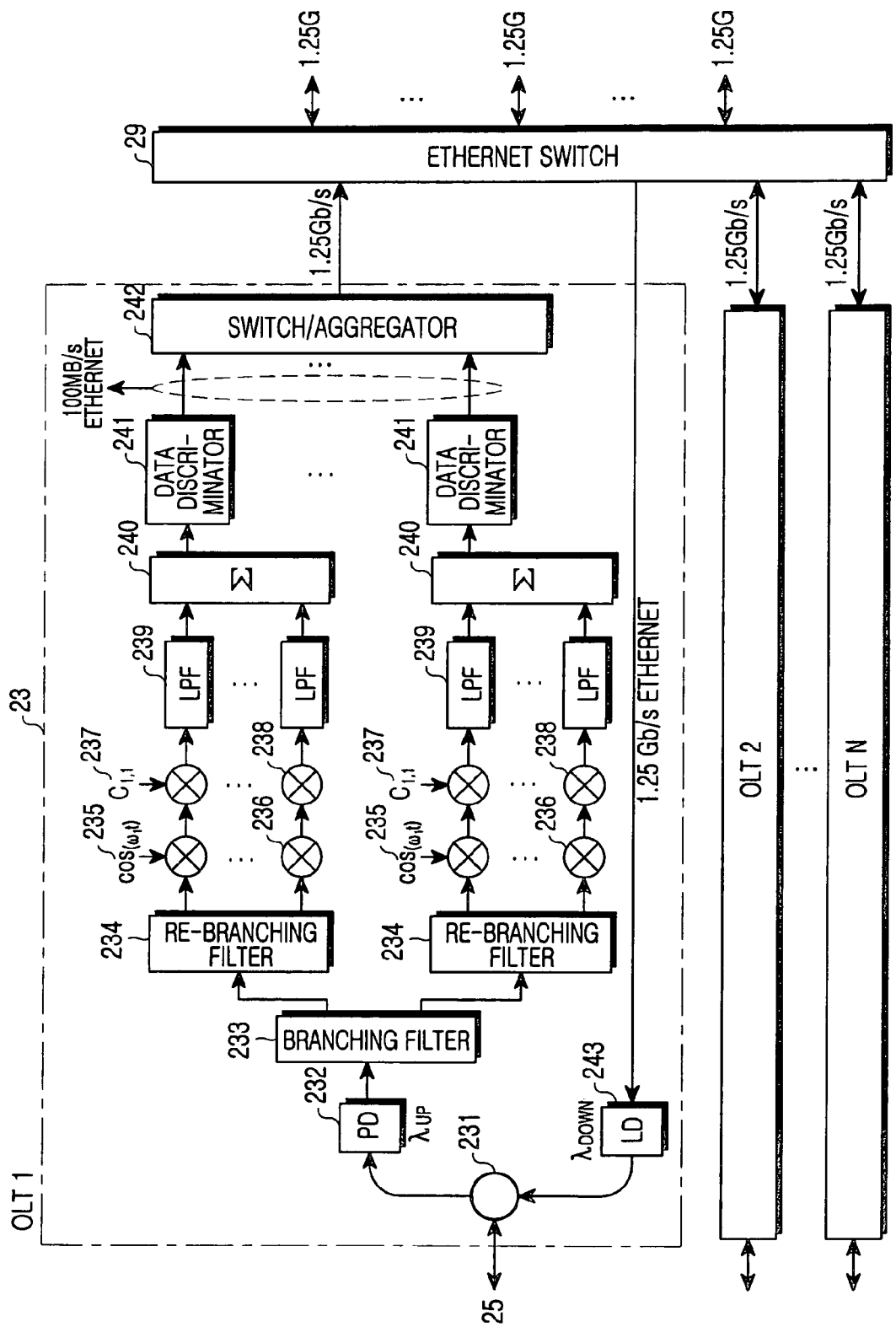

FIGS. 2a and 2b illustrate the construction of a PON employing a multi-carrier CDMA in which the multi-carrier CDMA scheme is applied for an upstream signal transmission according to an embodiment of the present invention. As shown in FIGS. 2a and 2b, a passive optical network (PON) employing a multi-carrier CDMA (Code Division Multiple Access) according to the present invention comprises at least sixteen ONUs (Optical Network Units) or ONTs (Optical Network Terminals) 21 (hereinafter, designated as "ONTs" for the purpose of simplicity) corresponding to the number of subscribers, at least one OLT (Optical Line Terminal) 23 for transmitting optical signals received from the sixteen ONTs 21 into a higher network and for transmitting signals received from the higher network into the ONTs 21, and a 1×16 optical coupler 25 for connecting the sixteen ONTs 21 and the OLT 23.

Each ONT 21 includes: a first switching means 211, which may be implemented with a hub or any other switch device, connected to a lower interface 27, such as computers; a level transformer 212 for transforming a 100 Mbps Ethernet signal having levels of '0' and '1'into that having levels of '−1' and '+1'; a multiplexer 213 for branching a level-transformed Ethernet signal into sixteen signals; a multiplier 215 for multiplying each of the branched Ethernet signals by each chip 214 of a CDMA code; a multiplier 217 for multiplying the multiplied signals by a plurality of carriers 216; a coupler 218 for coupling the signals having been multiplied by the carriers; a laser driver 219 for controlling a laser drive current; a laser diode 220 for performing optical modulation; an optical receiver (photo diode) 221 for receiving a 1.25 Gbps Ethernet signal transmitted from an OLT; and a WDM (Wavelength Division Multiplexing) filter 222 for dividing upstream wavelengths and downstream wavelengths.

Meanwhile, the OLT 23 includes: a WDM (Wavelength Division Multiplexing) filter 231 for dividing upstream wavelengths and downstream wavelengths; an optical receiver 232 for receiving an optical signal transmitted from an ONT; a 1×16 branching filter 233 for branching a received upstream signal; a 1×16 re-branching filter 234 for re-branching the branched signals so as to demodulate the signals; a multiplier 236 for multiplying the signals re-branched for signal demodulation by a plurality of carriers 235; a multiplier 238 for multiplying the signals having been multiplied by the carriers 235 by each chip 237 of a CDMA code; a low-pass filter 239 for removing signals in a high frequency band; a coupler 240 for coupling the low-passed signals; data discriminators 241 for discriminating data of the coupled signals; a second switching means 242, which may be implemented with an aggregator or any other switch device, for transforming a 100 Mbps Ethernet signal into a 1.25 Gbps Ethernet signal; and an optical transmitter 243 for transmitting the 1.25 Gbps Ethernet signal in the downstream direction.

Note that the OLTs 23 are connected with each other or to a higher network through a switch 29 having a plurality of 1.25 Gbps interfaces.

Now, the operation of the ONT and OLT will be described as follows.

First, data transmitted from a lower interface 27, such as a computer, undergoes a switching process or an aggregation process via the first switching means 211, and then are inputted into the level transformer 212 in a form of a 100 Mbps Ethernet signal. The level transformer 212 transforms a data signal having levels of '0' and '1' into that having levels of '−1' and '+1'.

Next, the level-transformed signal is branched into 16 signals through the multiplexer 213, which are then multiplied, in the multiplier 215, by corresponding chips 214 of a specific CDMA code assigned to each ONT 21, respectively. This process will be explained hereinafter with reference to FIG. 3.

Figure 3:
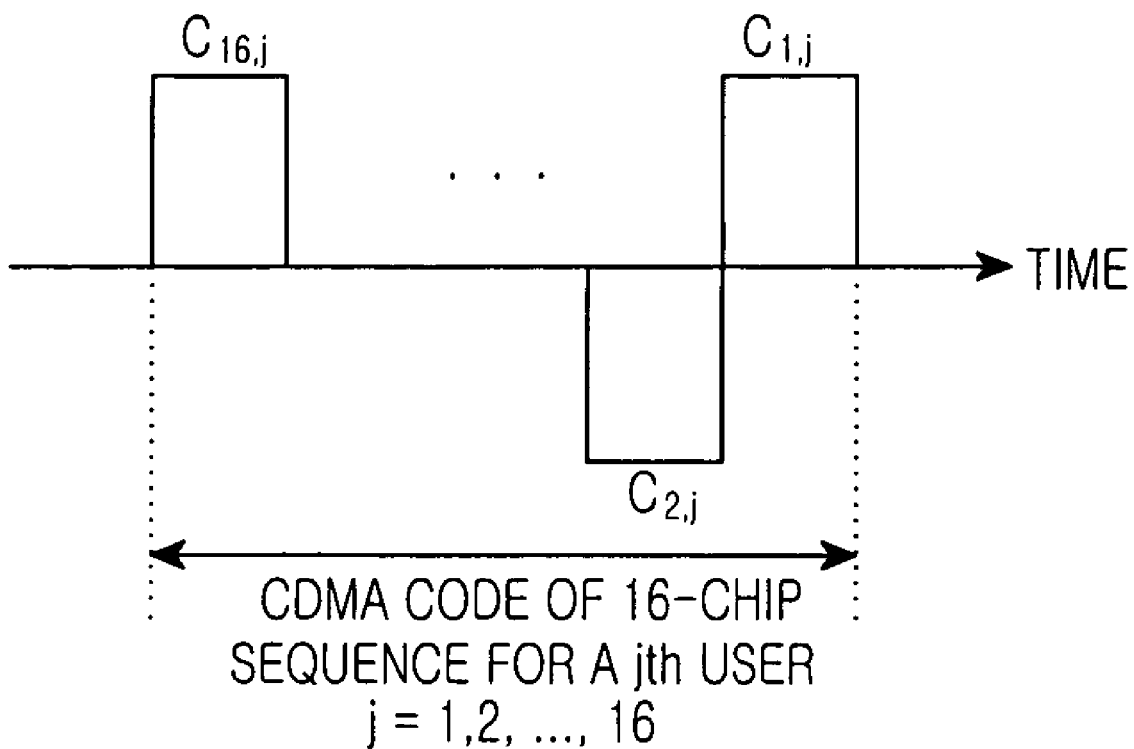
FIG. 3 is an example view illustrating a CDMA code used in the present invention.

As shown in FIG. 3, a CDMA code assigned to a $j^{th}$ ONT has 16 chips in a sequence, and each chip is multiplied by signals branched through the multiplexer 213. That is, a first signal of signals branched through the multiplexer 213 is multiplied by a first chip (C1, j) 214 of the CDMA code, a second signal is multiplied by a second chip (C2, j) 214 of the CDMA code, and a sixteenth signal is multiplied by a sixteenth chip (C16, j) 214 of the CDMA code.

Subsequently, the signals having been multiplied by each corresponding chip of the CDMA code are again multiplied, in the multiplier 217, by carriers 216 having different frequencies from each other. That is, a first signal is multiplied by a carrier having a first frequency f1, a second signal is multiplied by a carrier having a second frequency f2, and a sixteenth signal is multiplied by a carrier having a sixteenth frequency f16.

Figure 4:
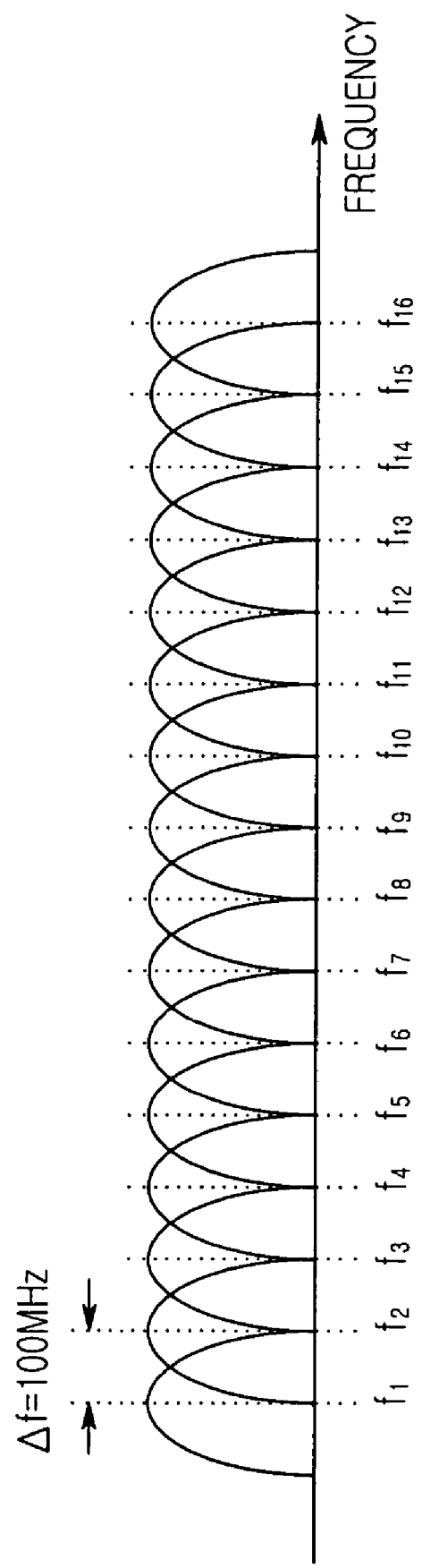
FIG. 4 is an example view illustrating the spectrums of frequencies coupled by a coupler of an ONT in a PON according to the present invention.

The signals having been multiplied by each carrier are coupled in the coupler 218. Frequency spectrums of the coupled signals is shown as FIG. 4. 16 frequency spectrums are connected at intervals of 100 MHz (1/Ts), while being overlapped with each other as shown in FIG. 4, in which the 'Ts' is one bit time of a 100 Mbps Ethernet signal to be inputted. However, each spectrum overlapped with other spectrums has a zero crossing at the maximum values of the latter spectrums, so that the orthogonal characteristic among each spectrum can be maintained, thereby preventing an interference problem between received signals.

The signal coupled by the coupler 218 is converted into laser drive levels in the laser driver 219, and optical-modulated in the laser diode 220 having an upstream wavelength $\lambda_{UP}$, and then transmitted to an OLT 23 through the WDM filter 222. A 1.25 Gbps Ethernet signal of $\lambda_{DOWN}$ transmitted downstream from an OLT 23 passes the WDM filter 222, converted into an electric signal in the optical receiver 221, and transmitted to a lower interface 27 through the first switching means 211.

Meanwhile, upstream optical signals of $\lambda_{UP}$ transmitted from each ONT 21 are coupled in the 1×16 optical coupler 25, and then transmitted to an OLT 23. The signal transmitted to the OLT 25 is divided to an optical receiver 232 through a WDM filter 231 in the OLT 23, received in the optical receiver 232, and branched into 16 signals in a 1×16 branching filter 233 so as to detect the respective signals transmitted from 16 number of ONTs 21. Since each of the branched signals includes 16 carriers, each of the branched signals is re-branched into 16 signals in the re-branching filter 234 in order to detect each carrier.

The re-branched signals are multiplied, in the multiplier 236, by carriers 235 having frequencies of f1 to f16 so as to remove carrier components. Each of the multiplied signals is multiplied, in the multiplier 238, by chips 237 of a specific CDMA code assigned to each ONT in the same process as that in the ONT. Since chips of each CDMA code have a perfectly orthogonal characteristic, it is possible to separate each signal transmitted from each ONT 21 through the above-mentioned CDMA-code multiplication process.

High frequency components are included in the signals multiplied by chips of a CDMA code, so a low-pass filter 239 is used to remove the high frequency components. The signals, in which high frequency components are removed, are added in a coupler 240, and 100 Mbps Ethernet data transmitted from each ONT 21 are restored by the data discriminators 241. The restored 100 Mbps Ethernet signal is transformed into a 1.25 Gbps Ethernet signal in the second switching means 242, and then transmitted to other OLTs 23 or connected to a higher network through an Ethernet switch 29 connected with a plurality of OLTs 23.

Meanwhile, 1.25 Gbps Ethernet data transmitted from a higher network or another OLT 23 through the Ethernet switch 29 are optical-modulated at an optical transmitter 243 in the OLT 23, pass a WDM filter 231, branched in a 1×16 optical coupler 25, and finally transmitted into ONTs 21.

Figure 5A:
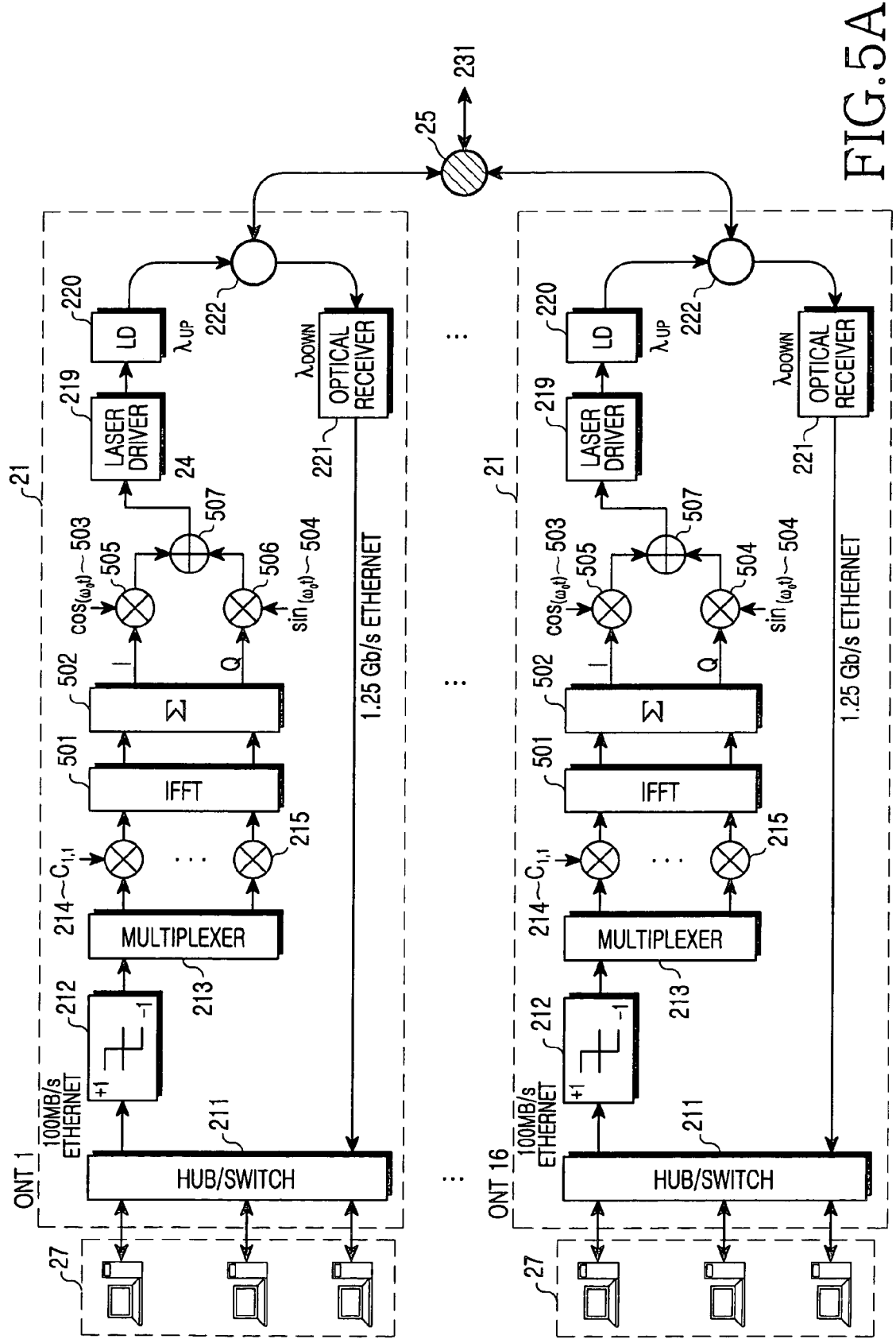
FIGS. 5a and 5b illustrate a PON employing a multi-carrier CDMA according to another embodiment of the present invention.
Figure 5B:
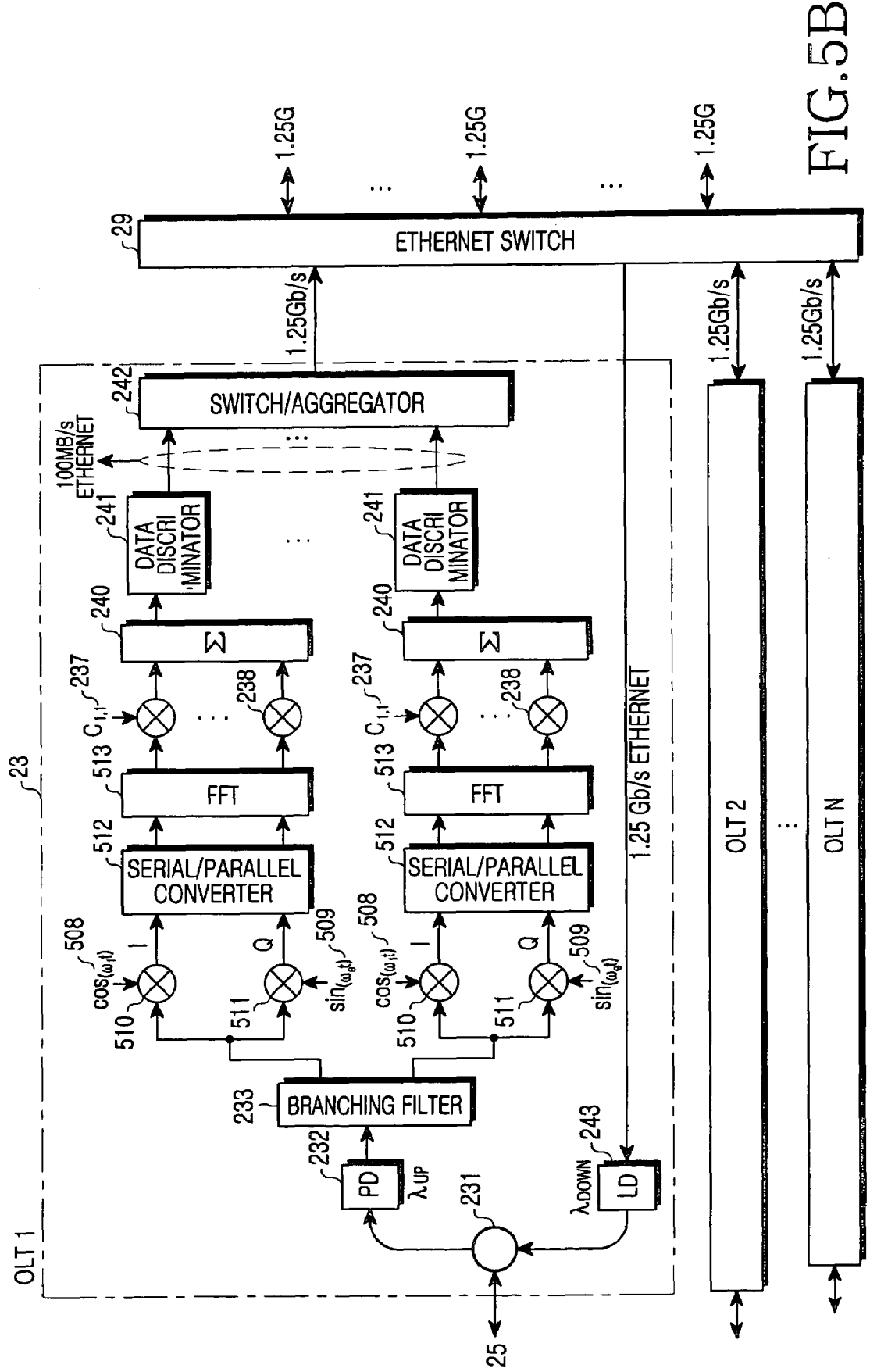

FIG. 5*a* and 5*b* illustrate the construction of a PON employing a multi-carrier CDMA according to another embodiment of the present invention.

The embodiment illustrated in FIGS. 5*a* and 5*b* shows a construction in which a plurality of carriers 216 and 235 and multipliers 217 and 236 in FIGS. 2*a* and 2*b* are replaced by an IFFT (Inverse Fast Fourier Transform) block 501 and an FFT (Fast Fourier Transform) block 513.

An ONT 21 shown in FIGS. 5*a* and 5*b*, like the construction of FIGS. 2*a* and 2*b*, uses a multiplexer 213 for branching a 100 Mbps Ethernet signal level—transformed by a level transformer 212 into 16 signals, and a multiplier 215 for multiplying the branched signals by a CDMA code 214.

The ONT 21 includes: an IFFT 501 for performing an inverse Fourier Transform on the multiplied signals; a coupler 502 for performing a parallel/serial conversion on the inverse-Fourier-transformed signals; a multiplier 505 for multiplying 'I' components (real components) by a cosine carrier 503; a multiplier 506 for multiplying 'Q' components (imaginary components) by a sine carrier 504; and an adder 507 for adding the real components and the imaginary components multiplied by carriers through the multipliers 505 and 506.

Also, the ONT 21 includes a laser driver 219 and a laser diode 220 for performing optical modulation, an optical receiver 221 for receiving a 1.25 Gbps Ethernet signal, and a WDM filter 222.

Meanwhile, an OLT 23 includes: a WDM filter 231; an optical receiver 232; a 1×16 branching filter 233; multipliers 510 and 511 for multiplying received signals by a cosine carrier 508 or a sine carrier 509 so as to divide the received signals into real components and imaginary components; a 1×16 serial/parallel converter 512 for performing a serial/parallel conversion on the divided real components and imaginary components; an FFT 513 for performing a Fourier Transform on the parallel signals converted through the 1×16 serial/parallel converter 512; a multiplier 238 for multiplying the Fourier-transformed signals by a CDMA code 237; a coupler 240 for adding the signals having passed the multiplier 238; a data discriminator 241 for extracting data of the coupled signals; an optical transmitter 243 for transmitting a 1.25 Gbps Ethernet signal in the downstream direction; and a second switching means 242, which may be implemented with an aggregator or any other switch device, for transforming a signal into a 1.25 Gbps Ethernet signal.

Also, the OLT 23 includes an Ethernet switch 29 for connecting with other OLTs 23 or a higher network.

The operation principle of the Ethernet PON, as shown in FIGS. 5a and 5b according to the present invention, employing CDMA method for an upstream signal is as follows.

First, a data signal transmitted from a lower interface 27 passes the first switching means 211, is transformed into a signal having levels of '−1' and '+1' by the level transformer 212, and is branched into 16 signals through the multiplexer 213. Next, the branched signals are multiplied by chips 214 of a specific CDMA code assigned according to each ONT 21. A signal conversion process will be explained as follows with reference to FIG. 6.

Table 1 shows a Walsh code table having a 16-chip sequence assigned to sixteen subscribers in the case that the Walsh Hadamard codes are used as CDMA codes. Each code has a perfectly orthogonal characteristic.

in the multiplier 505, by a cosine carrier 503 having a frequency of f0, and the imaginary components are multiplied, in the multiplier 506, by a sine carrier 504. Subsequently, the multiplied real components and imaginary components are added in the adder 507.

The added signal is converted into an optical modulation level in the laser driver 219, converted into an optical signal in the laser diode 220, and transmitted to an OLT 23 through a WDM filter 222. A 1.25 Gbps Ethernet signal transmitted downstream from an OLT 23, in the same manner as that described in FIG. 2, is received in the optical receiver 221.

Meanwhile, upstream optical signals transmitted from each ONT 21 are inputted into an OLT 23 through the 1×16 optical coupler 25, and transmitted to the optical receiver 232 by the WDM filter 231 in the OLT 23. The signal converted into an electric signal by the optical receiver 232 is branched into 16 signals in the 1×16 branching filter 233. Each of the branched signals is multiplied, in the multiplier 510, by a cosine carrier 508 having a frequency of f0, and

TABLE 1

| Walsh code | Chip order | | | | | | | | | | | | | | | |
|---|---|---|---|---|---|---|---|---|---|---|---|---|---|---|---|---|
| | c0 | c1 | c2 | c3 | c4 | c5 | c6 | c7 | c8 | c9 | c10 | c11 | c12 | c13 | c14 | c15 |
| Code 1 | 1 | 1 | 1 | 1 | 1 | 1 | 1 | 1 | 1 | 1 | 1 | 1 | 1 | 1 | 1 | 1 |
| Code 2 | 1 | −1 | 1 | −1 | 1 | −1 | 1 | −1 | 1 | −1 | 1 | −1 | 1 | −1 | 1 | −1 |
| Code 3 | 1 | 1 | −1 | −1 | 1 | 1 | −1 | −1 | 1 | 1 | −1 | −1 | 1 | 1 | −1 | −1 |
| Code 4 | 1 | −1 | −1 | 1 | 1 | −1 | −1 | 1 | 1 | −1 | −1 | 1 | 1 | −1 | −1 | 1 |
| Code 5 | 1 | 1 | 1 | 1 | −1 | −1 | −1 | −1 | 1 | 1 | 1 | 1 | −1 | −1 | −1 | −1 |
| Code 6 | 1 | −1 | 1 | −1 | −1 | 1 | −1 | 1 | 1 | −1 | 1 | −1 | −1 | 1 | −1 | 1 |
| Code 7 | 1 | 1 | −1 | −1 | −1 | −1 | 1 | 1 | 1 | 1 | −1 | −1 | −1 | −1 | 1 | 1 |
| Code 8 | 1 | −1 | −1 | 1 | −1 | 1 | 1 | −1 | 1 | −1 | −1 | 1 | −1 | 1 | 1 | −1 |
| Code 9 | 1 | 1 | 1 | 1 | 1 | 1 | 1 | 1 | −1 | −1 | −1 | −1 | −1 | −1 | −1 | −1 |
| Code 10 | 1 | −1 | 1 | −1 | 1 | −1 | 1 | −1 | −1 | 1 | −1 | 1 | −1 | 1 | −1 | 1 |
| Code 11 | 1 | 1 | −1 | −1 | 1 | 1 | −1 | −1 | −1 | −1 | 1 | 1 | −1 | −1 | 1 | 1 |
| Code 12 | 1 | −1 | −1 | 1 | 1 | −1 | −1 | 1 | −1 | 1 | 1 | −1 | −1 | 1 | 1 | −1 |
| Code 13 | 1 | 1 | 1 | 1 | −1 | −1 | −1 | −1 | −1 | −1 | −1 | −1 | 1 | 1 | 1 | 1 |
| Code 14 | 1 | −1 | 1 | −1 | −1 | 1 | −1 | 1 | −1 | 1 | −1 | 1 | 1 | −1 | 1 | −1 |
| Code 15 | 1 | 1 | −1 | −1 | −1 | −1 | 1 | 1 | −1 | −1 | 1 | 1 | 1 | 1 | −1 | −1 |
| Code 16 | 1 | −1 | −1 | 1 | −1 | 1 | 1 | −1 | −1 | 1 | 1 | −1 | 1 | −1 | −1 | 1 |

Figure 6:
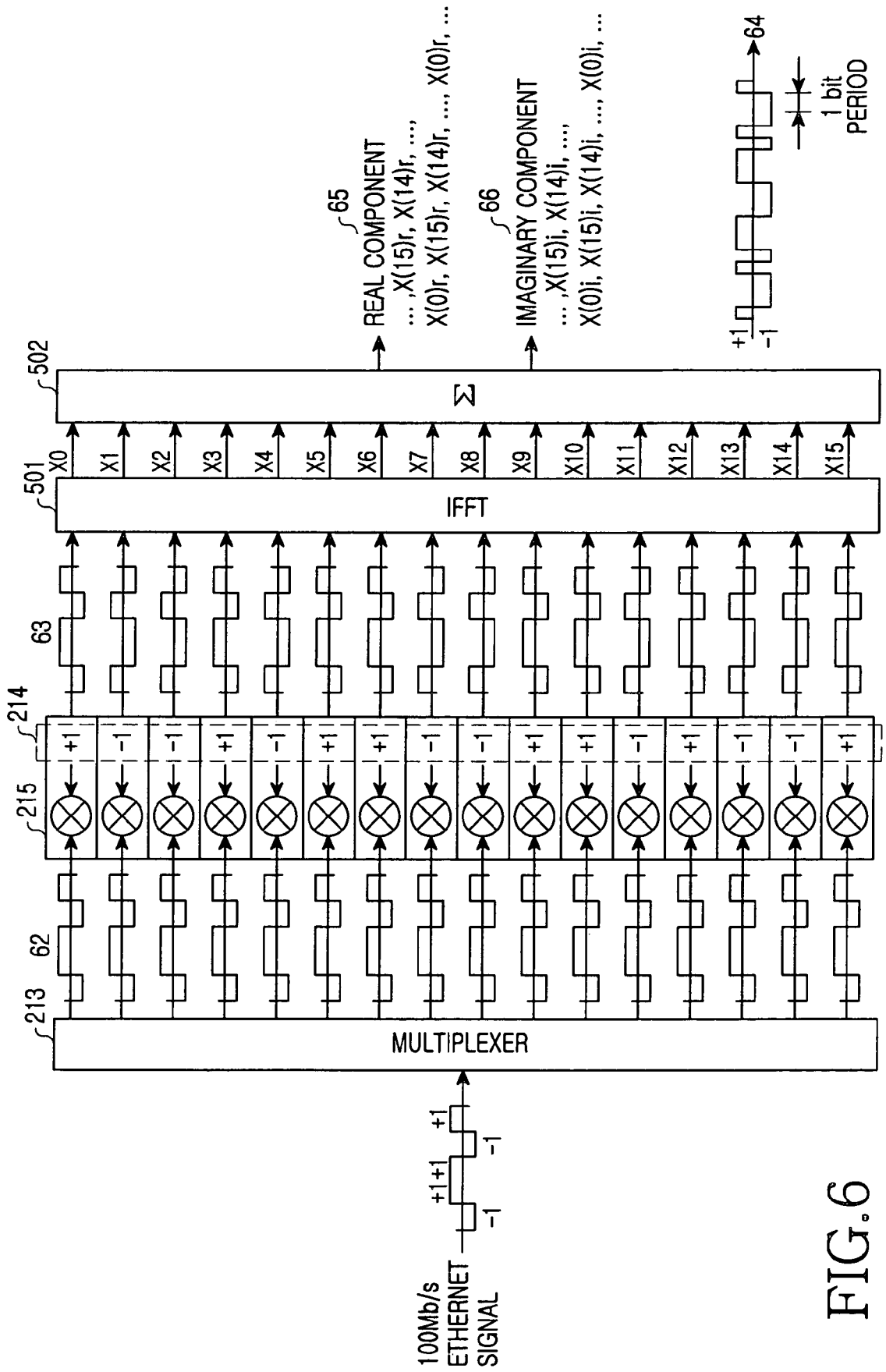
FIG. 6 is an example view illustrating a signal conversion generated in an ONT according to the embodiment shown in FIGS. 5a and 5b.

FIG. 6 is an example view illustrating a signal conversion generated in an ONT according to the embodiment shown in FIGS. 5a and 5b. For example, in the case of the sixteenth ONT, a CDMA code of '+1, −1, −1, +1, −1, +1, +1, −1, −1, +1, +1, −1, +1, −1, −1, +1 ' 64 is assigned according to the Walsh code table shown in Table 1. Each chip 214 in the assigned CDMA code is multiplied, in the multiplier 215, by respective signals 62 having been branched by the multiplexer 213. In the case in which a chip has a value of '+1', an input signal is unchangeably outputted, but in the case in which a chip has a value of '−1', an input signal is reversed by 180 degrees and is outputted. Signals 63 multiplied by chips 214 in the CDMA code 64 undergo an inverse Fourier Transform process in the IFFT 501, and thereby outputting signals X(0) to X(15) having both of a real component and an imaginary component. Herein, X(k) is defined as follows:

$X(k)=X(k)r+jX(k)i,$ wherein X(k)r represents a real component and X(k)i represents an imaginary component.

Signal components outputted through the IFFT 501 are converted by the coupler 502 from a parallel state to a serial state. That is, components X(0) to X(15) inputted in parallel are outputted sequentially in the form of ". . . X(15), X(14), . . . , X(0), X(15), X(14), . . . , X(0), . . . " 65 and 66. Of the outputted signals, the real components are multiplied, also multiplied, in the multiplier 511, by a sine carrier 509 so as to divide each signal into real components and imaginary components. Through this process, real components 65 and imaginary components 66 are detected. A process for outputting each signal divided into real components 65 and imaginary components 66 is shown in more detail in FIG. 7.

Figure 7:
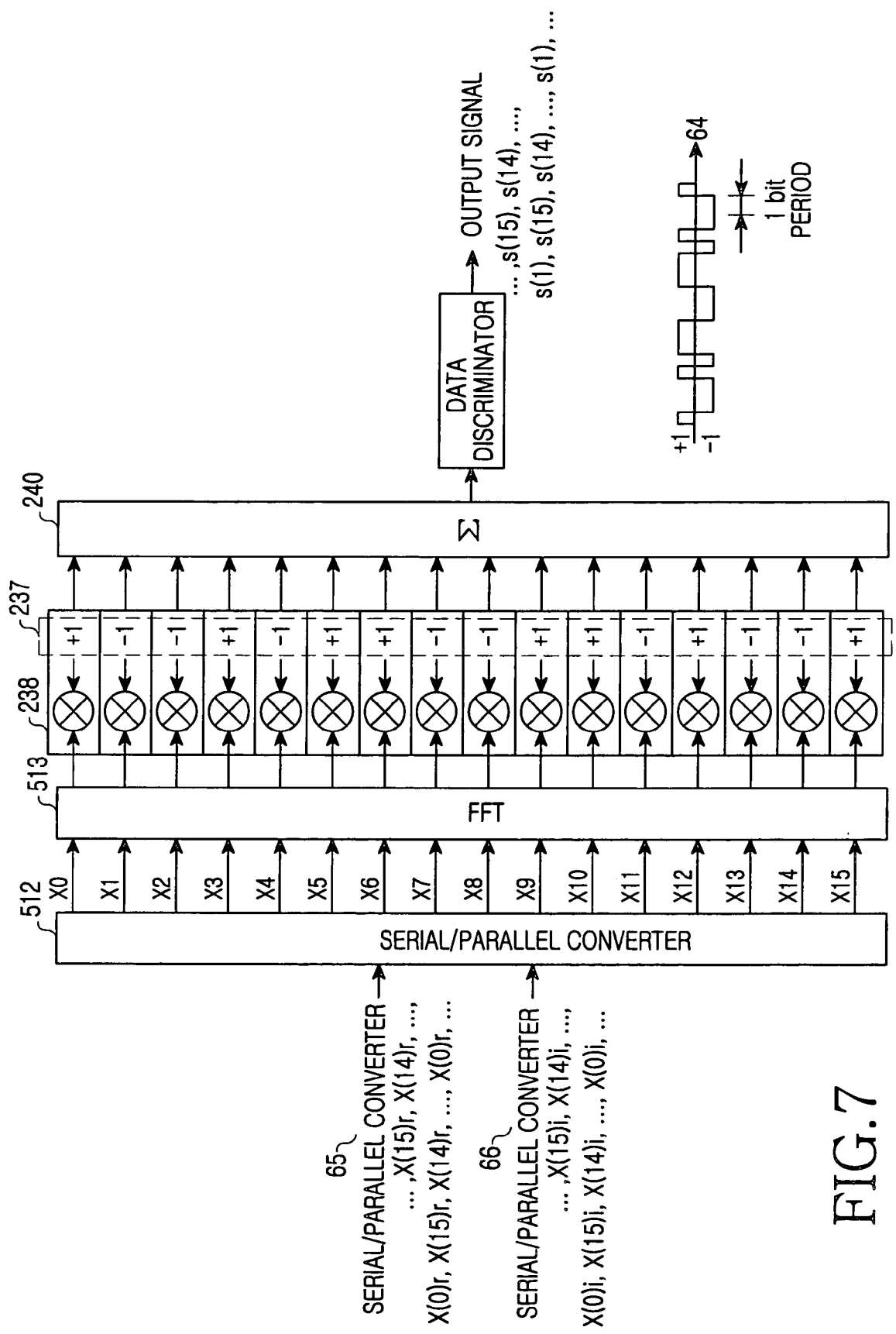
FIG. 7 is an example view illustrating signals in an OLT according to the embodiment shown in FIGS. 5a and 5b.

As shown in FIG. 7, the signals divided into real components 65 and imaginary components 66 are converted into parallel components X(0) to X(15) through the serial/parallel converter 512, and then inputted into the FFT 513. Fourier-transformed signals through the FFT 513 are multiplied, in the multiplier 238, by each chip 237 in the same assigned CDMA code 64 as in the ONT 21 so as to extract signal components transmitted from each ONT. Through this process, signal components transmitted from each ONT 21 are detected. The detected signals are added to each other in the coupler 240, and then transmitted to the data discriminator 241. Thereafter, the data discriminator 241 restores 100 Mbps Ethernet signals transmitted from each ONT.

The restored 100 Mbps Ethernet signal is transformed into a 1.25 Gbps Ethernet signal in the second switching means 242, and then transmitted to other OLTs 23 or connected to a higher network through an Ethernet switch 29.

Meanwhile, a 1.25 Gbps Ethernet signal transmitted from the Ethernet switch 29 to each ONT 21 is optical-modulated at an optical transmitter 243 in the OLT 23, passes a WDM filter 231 and a 1×16 optical coupler 25, and then transmitted into each ONT 21.

Figure 8A:
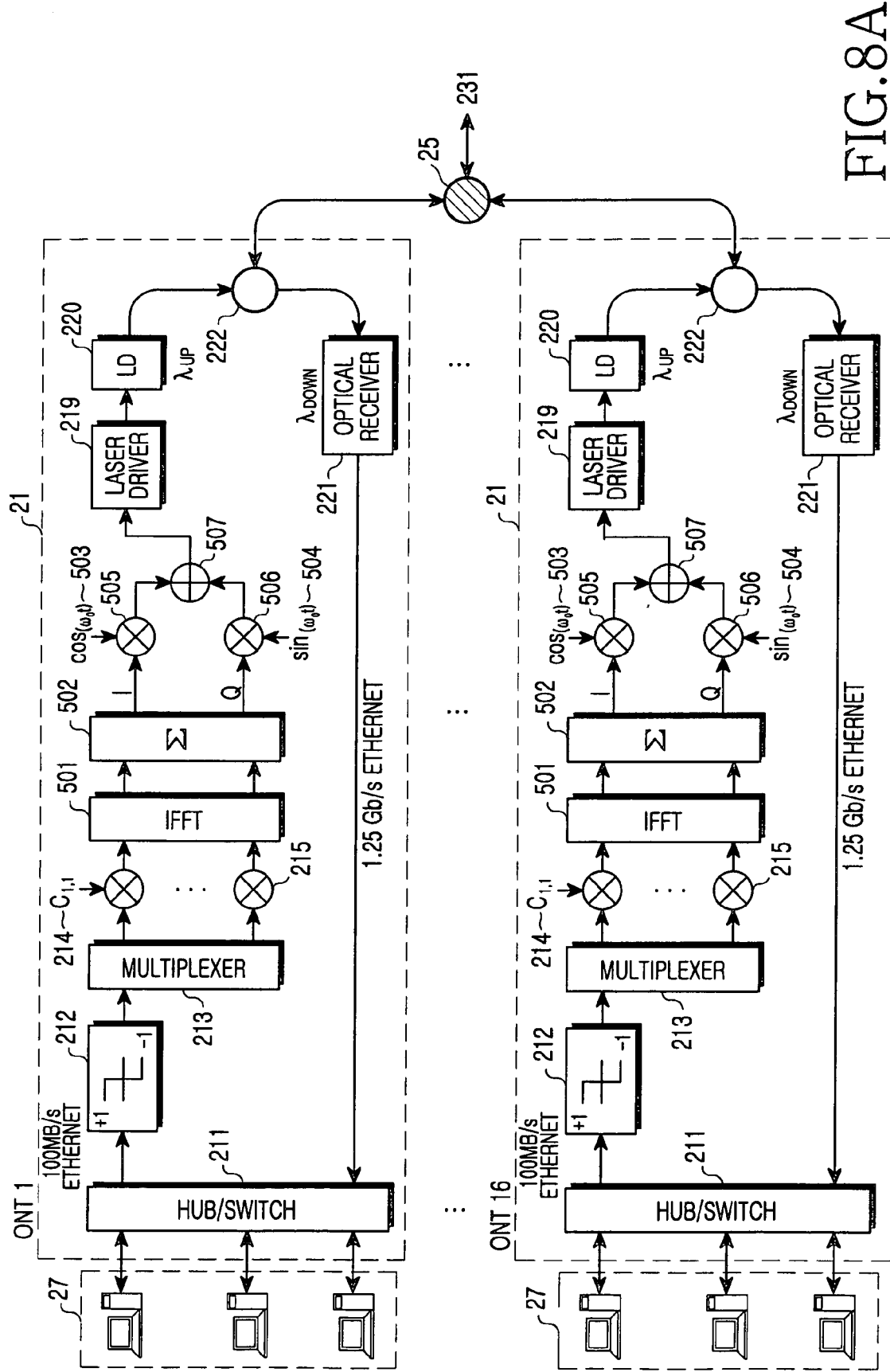
FIGS. 8a and 8b illustrate a second embodiment modified from the PON employing a multi-carrier CDMA shown in FIGS. 5a and 5b according to the present invention.
Figure 8B:
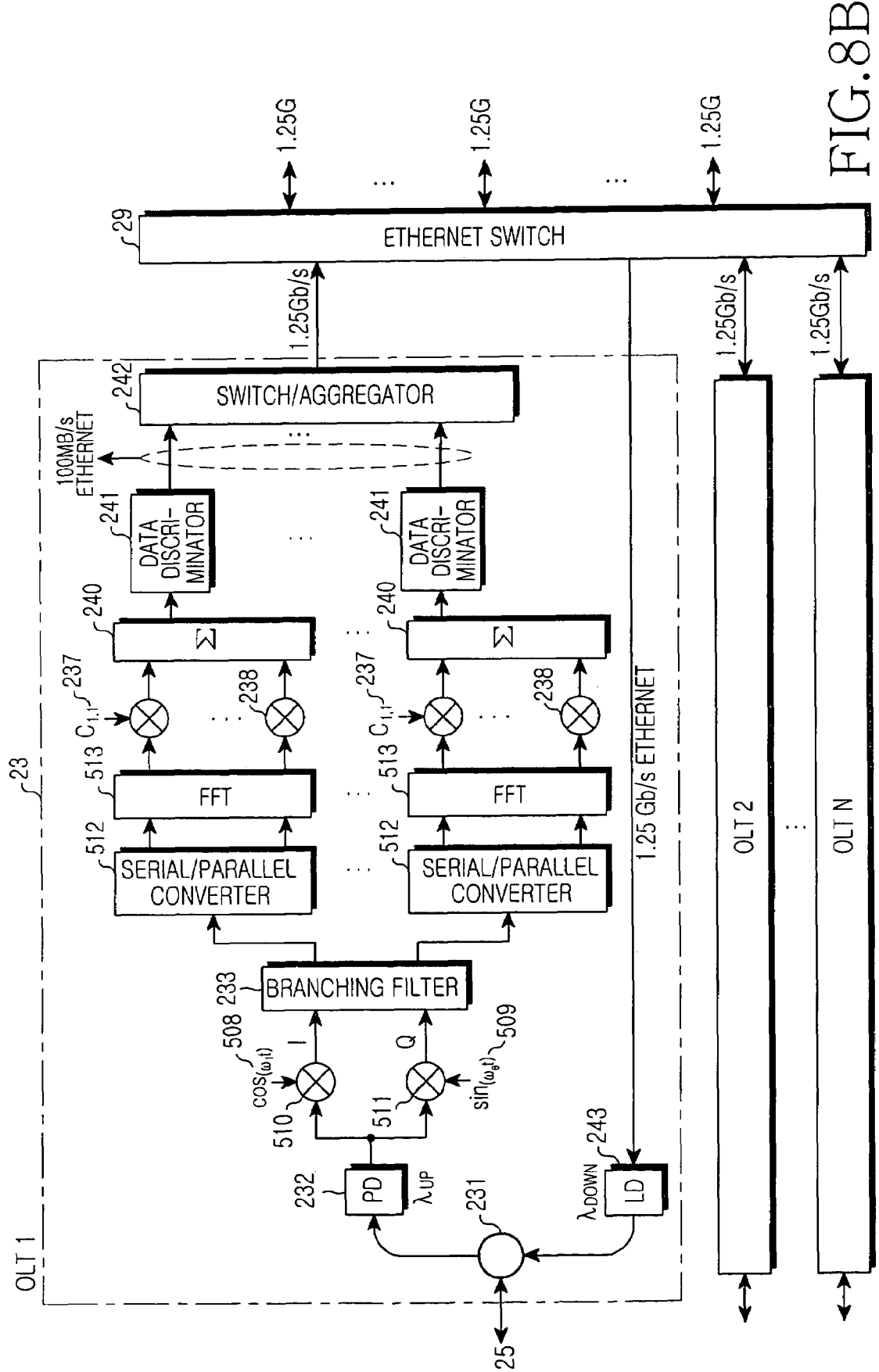

FIGS. 8a and 8b illustrate the construction of a second embodiment modified from the PON employing a multi-carrier CDMA shown in FIGS. 5a and 5b according to the present invention. As shown, multipliers for dividing received signals into real components and imaginary components in an OLT are located at output part of an optical receiver.

The construction and operation of an ONT 21 shown in FIGS. 8a and 8b are identical with those of FIGS. 5a and 5b. Thus, only the following explanation about the operation and characteristics of the OLT 23 will be given to avoid redundancy.

Upstream optical signals transmitted from each ONT 21 are inputted into the OLT 23 through a 1×16 optical coupler 25, and then are transmitted to the optical receiver 232 through the WDM filter 231 in the OLT 23. The signal converted into an electric signal by the optical receiver 232 is multiplied, in the multiplier 510, by a cosine carrier 508 having a frequency of f0, and is also multiplied, in the multiplier 511, by a sine carrier 509 so as to divide each signal into real components and imaginary components. Through this process, real components 65 and imaginary components 66 are detected.

The signals divided into the real component 65 and the imaginary component 66 are respectively branched into 16 signals in the 1×16 branching filter 233. Each of the branched real and imaginary signals is converted into parallel components X(0) to X(15) through the serial/parallel converter 512, and then inputted into the FFT 513. Fourier-transformed signals through the FFT 513 are multiplied, in the multiplier 238, by chips 237 in the same assigned CDMA code 64 as in the ONT 21 so as to extract signal components transmitted from each ONT 21. Through this process, signal components transmitted from each ONT 21 are detected, and then the detected signals are added in the coupler 240. Then, from the added signals, the data discriminator 241 restores the 100 Mbps Ethernet signals transmitted from each ONT.

The restored 100 Mbps Ethernet signal is transformed into a 1.25 Gbps Ethernet signal in the second switching means 242, and then transmitted to other OLTs 23 or connected to a higher network through an Ethernet switch 29.

Meanwhile, a 1.25 Gbps Ethernet signal transmitted from the Ethernet switch 29 to each ONT 21 is optical-modulated at an optical transmitter 243 in the OLT 23, passes a WDM filter 231 and a 1×16 optical coupler 25, and finally transmitted into each ONT 21.

Figure 9A:
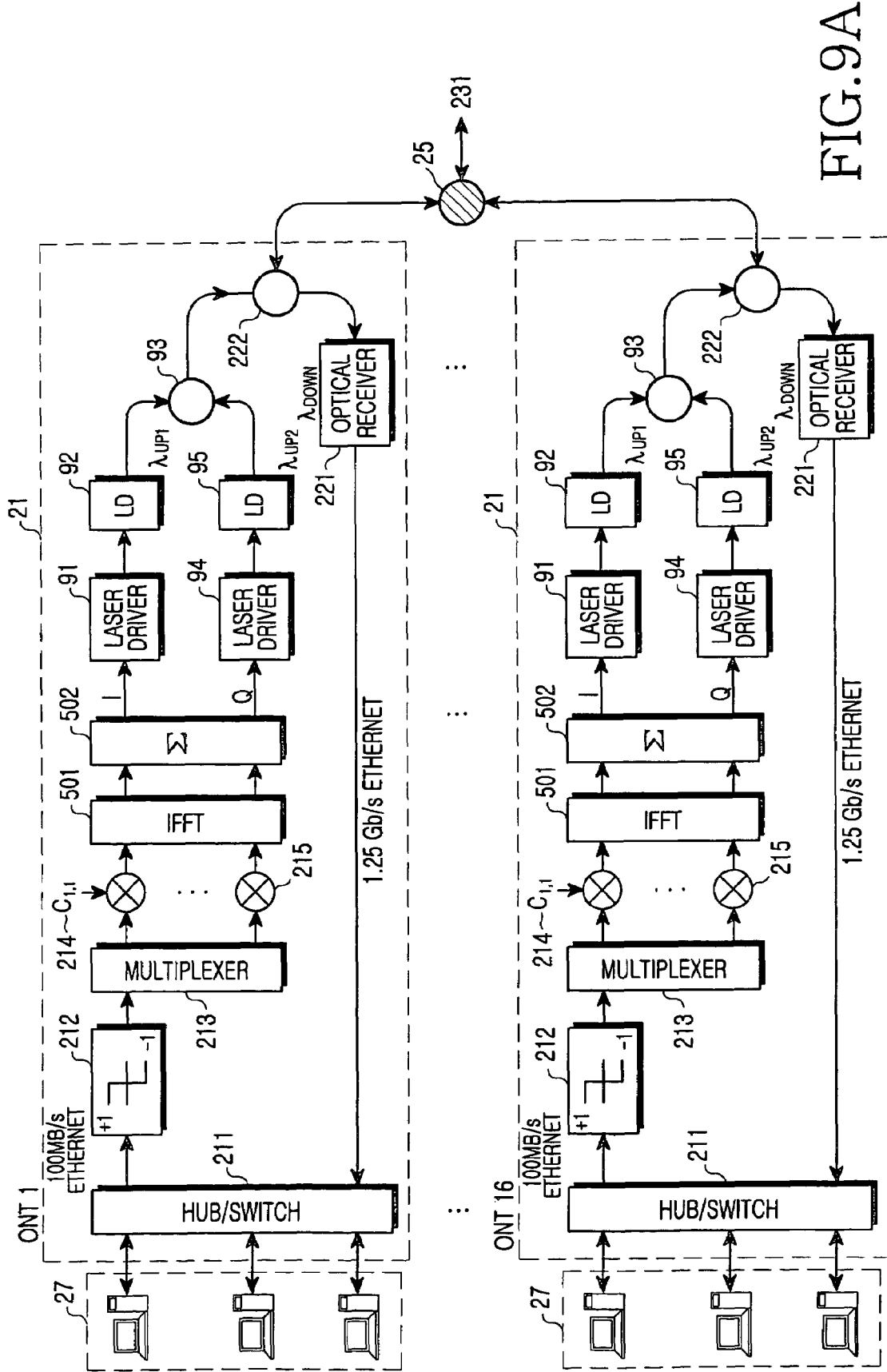
FIGS. 9a and 9b illustrate a third embodiment modified from the PON employing a multi-carrier CDMA shown in FIGS. 5a and 5b according to the present invention.
Figure 9B:
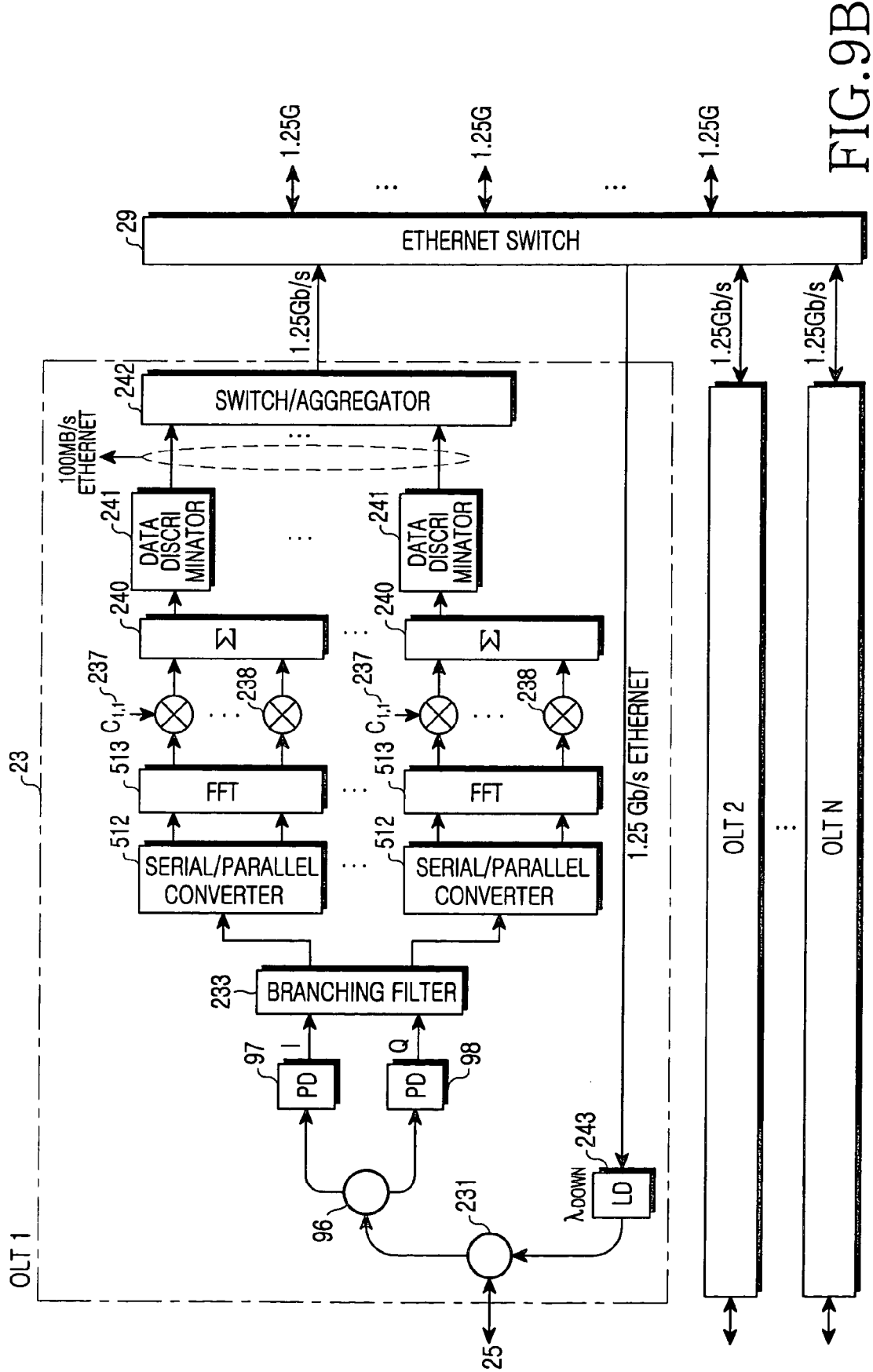

FIGS. 9a and 9b illustrate the construction of a third embodiment modified from the PON employing a multi-carrier CDMA shown in FIGS. 5a and 5b according to the present invention. The embodiment shown in FIGS. 9a and 9b is characteristic in that real components and imaginary components are both optical-modulated and transmitted, and also the optical-modulated components are received and modulated into electric signals.

The embodiment shown in FIGS. 9a and 9b is a third embodiment modified from the PON shown in FIGS. 5a and 5b, comprises respective laser drivers 91 and 94 and respective laser diodes 92 and 95 in an ONT 21 for each of the real component and the imaginary component so as to optical-modulate each of the signal components, and comprises an optical coupler 93 for coupling the signal components. Also, an OLT 23 according to this embodiment comprises an optical branching filter 96 for branching two wavelengths transmitted from the ONT 21, and also comprises optical receivers 97 and 98 for respectively receiving two kinds of optical signals, each of which includes one of the two signal components, branched through the optical branching filter 96.

To be more specific, the embodiment shown in FIGS. 9a and 9b—unlike the embodiment shown in FIGS. 5a and 5b in which the ONT 21 and the OLT 23 use cosine carriers, sine carriers, and multipliers so as to divide real components and imaginary components of a transmitted signal—is characteristic in that an optical transmission section 91, 92 and 93 for transmitting real components and an optical transmission section 94, 95 and 93 for transmitting imaginary components are respectively comprised in an ONT 21, and each of the optical transmission sections uses different wavelengths from each other. That is, an optical signal including real components and an optical signal including imaginary components are coupled in an optical coupler 93 and transmitted to the OLT 23. In the OLT 23, an upstream signal passes an optical branching filter 96 and inputted into optical receivers 97 and 98. At this time, the OLT 23 is characteristic of comprising the optical receiver 97 for detecting real components and the optical receiver 98 for detecting imaginary components, respectively.

In the embodiment shown in FIGS. 9a and 9b, the others—with the exception of the above signal transmission/receipt process between the OLT 23 and the ONT 21—are the same as the embodiment shown in FIGS. 5a and 5b. Accordingly, the difference of the two embodiments is as follows: In the embodiment shown in FIGS. 9a and 9b, each of electrically-different real and imaginary components is modulated into an optical signal, the two modulated optical signals are added to each other, and the added optical signal is transmitted; while in the embodiment shown in FIGS. 5a and 5b, electrically added real and imaginary components are first transmitted as an optical signal, and a received optical signal is divided into the real component and the imaginary component.

Figure 10A:
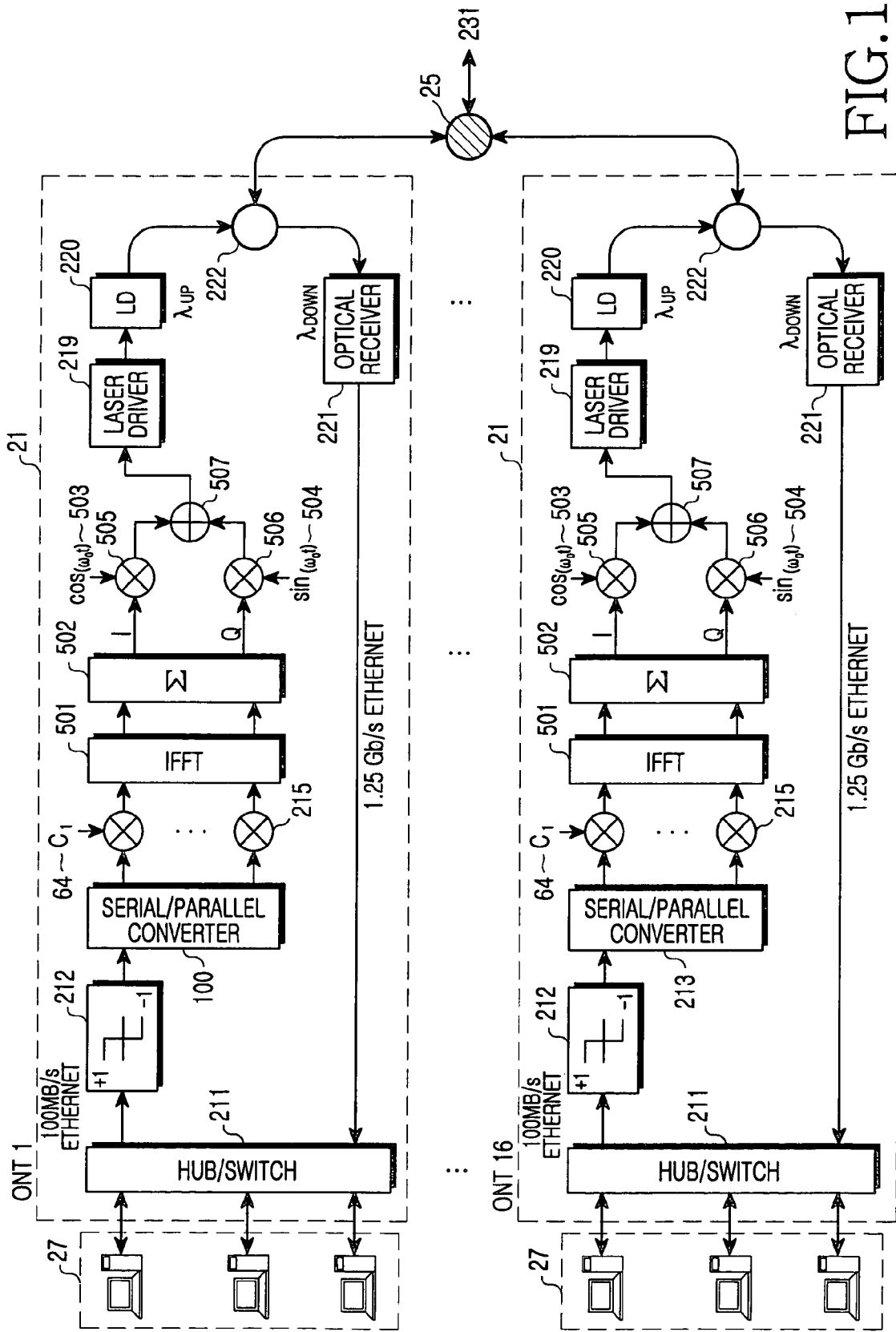
FIGS. 10a and 10b illustrate a fourth embodiment modified from the PON employing a multi-carrier CDMA shown in FIGS. 5a and 5b according to the present invention.
Figure 10B:
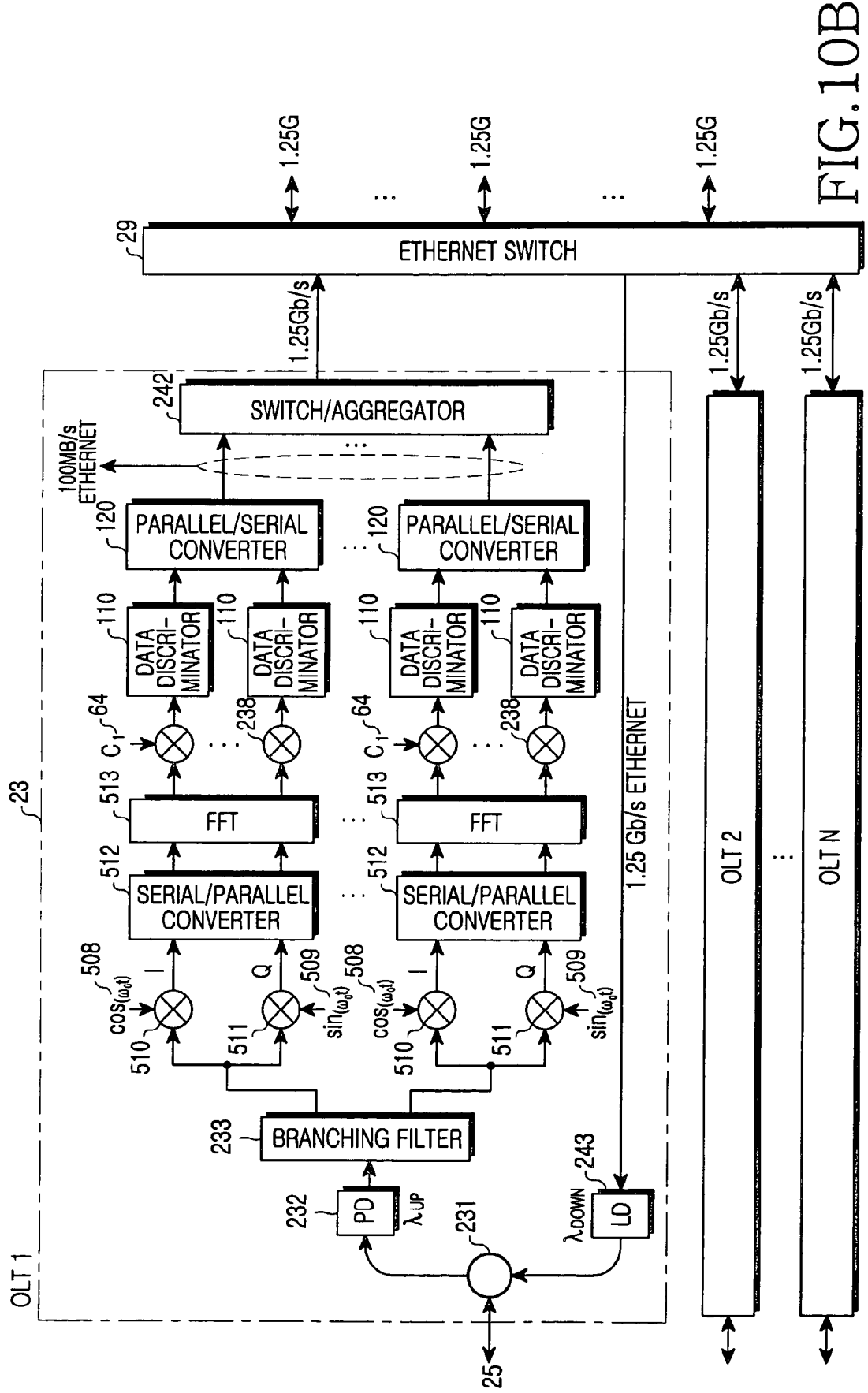

FIGS. 10a and 10b illustrate the construction of a fourth embodiment modified from the PON employing a multi-carrier CDMA shown in FIGS. 5a and 5b according to the present invention.

In an ONT 21 shown in FIGS. 10a and 10b, a 100 Mbps Ethernet signal level-transformed by a level transformer 212 is converted into parallel signals by a serial/parallel converter 100 which converts a serial signal into a parallel signal. In the ONT21, a multiplier 215 is used to multiply the parallel signals by a CDMA code 64.

The ONT 21 includes: an IFFT 501 for performing an inverse Fourier Transform on the multiplied signals; a coupler 502 for performing a parallel/serial conversion on the inverse-Fourier-transformed signals; a multiplier 505 for multiplying 'I' components (real components) by a cosine carrier 503; a multiplier 506 for multiplying 'Q' components (imaginary components) by a sine carrier 504; and an adder 507 for adding the real components and the imaginary components multiplied by carriers through the multipliers 505 and 506.

The ONT 21 includes a laser driver 219 and a laser diode 220 for performing optical modulation, an optical receiver 221 for receiving a 1.25 Gbps Ethernet signal, and a WDM filter 222.

Meanwhile, an OLT 23 includes: a WDM filter 231; an optical receiver 232; a 1×16 branching filter 233; multipliers 510 and 511 for multiplying received signals by a cosine carrier 508 or a sine carrier 509 so as to divide the received signals into real components and imaginary components; a 1×16 serial/parallel converter 512 for performing a serial/ parallel conversion on the divided real components and imaginary components; an FFT 513 for performing a Fourier Transform on the parallel signals converted through the 1×16 serial/parallel converter 512; a multiplier 238 for multiplying the Fourier-transformed signals by a CDMA code 64; data discriminators 110 for extracting data from each parallel signal outputted through the multiplier 238; a parallel/serial converter 120 for converting a parallel signal into a serial signal; and a second switching means 242, which may be implemented with an aggregator or any other switch device, for transforming a signal into a 1.25 Gbps Ethernet signal. Also, the OLT 23 includes an optical transmitter 243 for transmitting a 1.25 Gbps Ethernet signal in the downstream direction.

In addition, the OLT 23 includes an Ethernet switch 29 for connecting with other OLTs 23 or a higher network.

Figure 11:
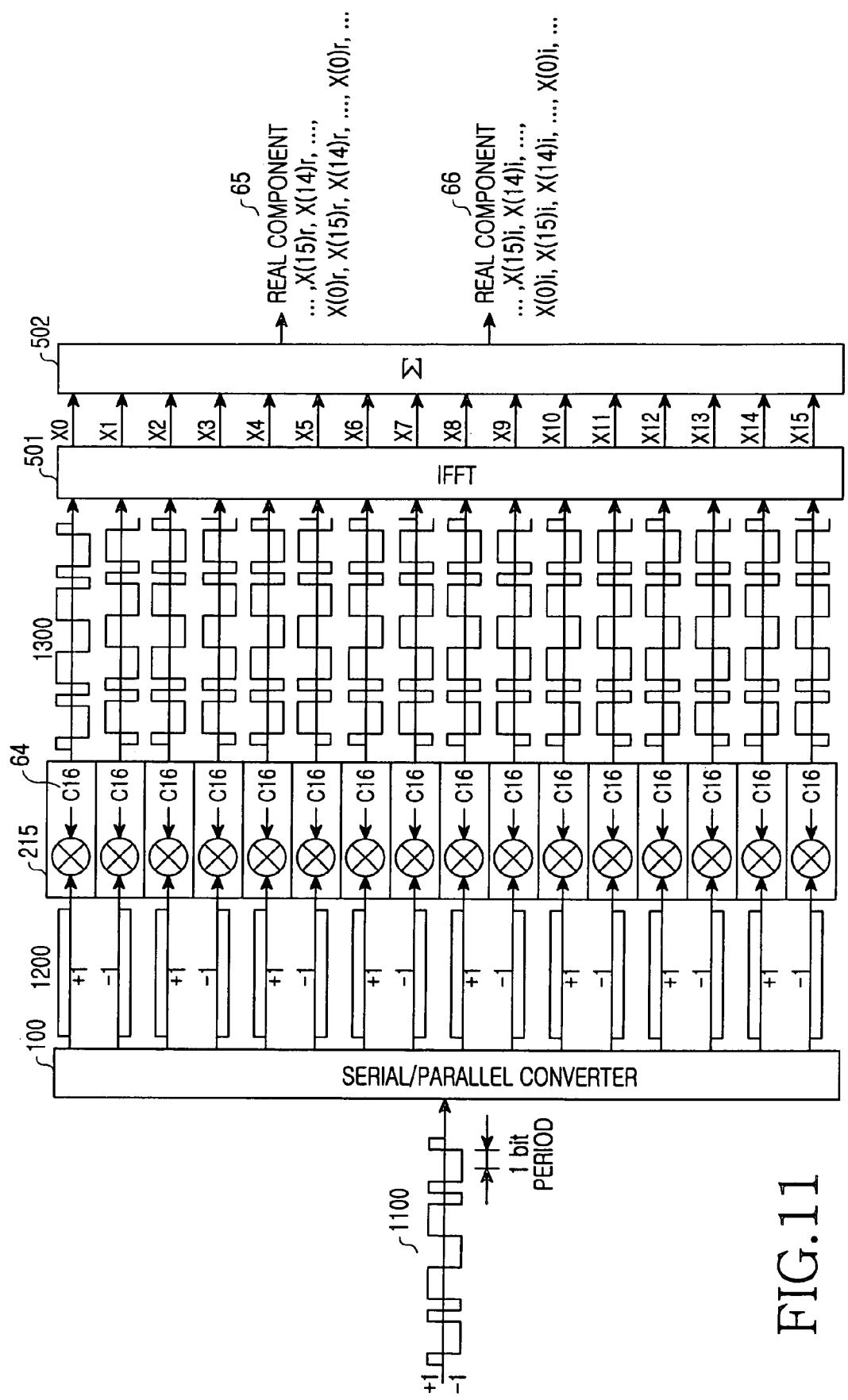
FIG. 11 is an example view illustrating signals in an ONT according to the embodiment shown in FIGS. 10a and 10b.
Figure 12:
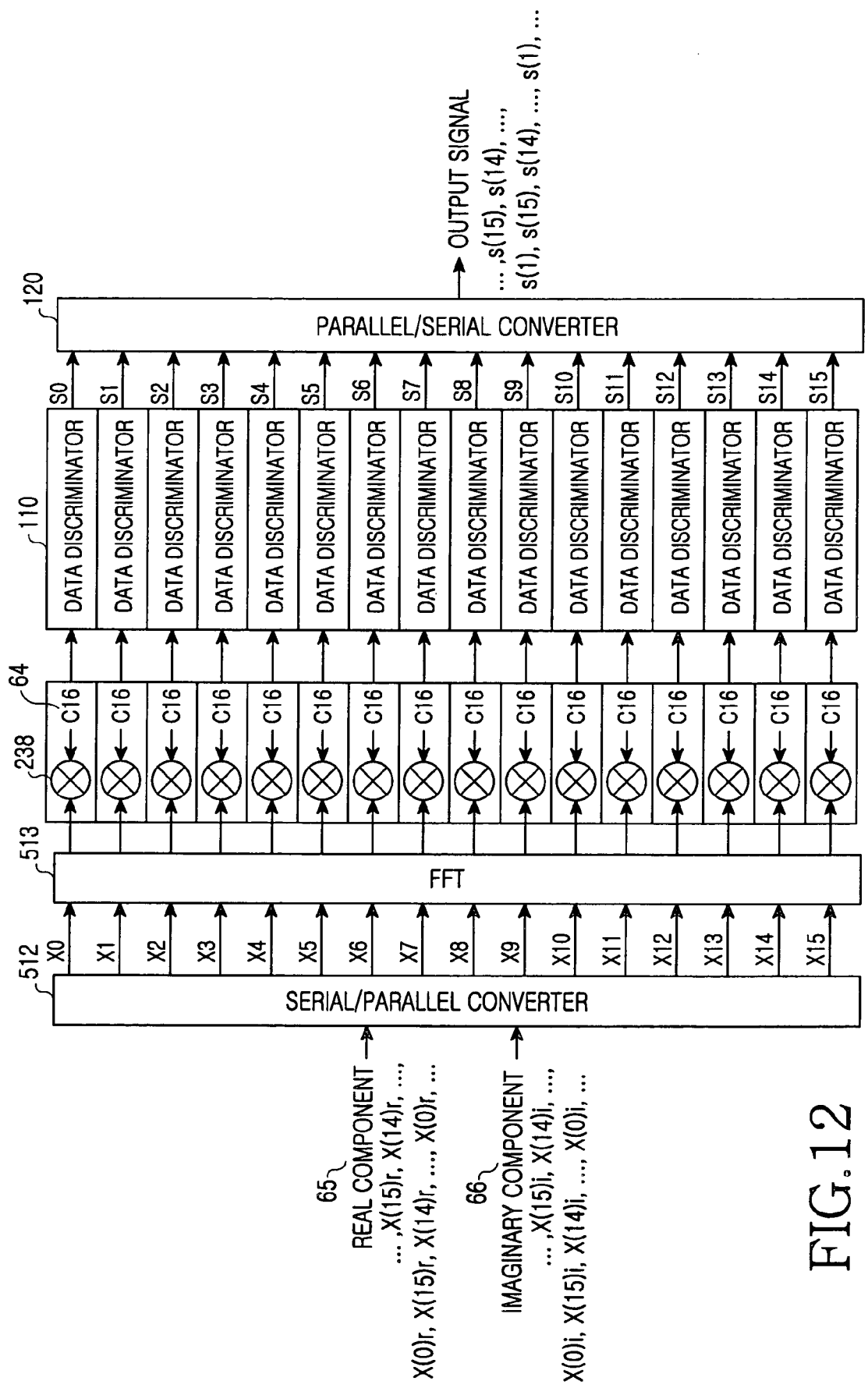
FIG. 12 is an example view illustrating signals in an OLT according to the embodiment shown in FIG. 10a and 10b.

The operation principle of the Ethernet PON shown in FIGS. 10*a* and 10*b* according to the present invention is as follows. Particularly, in order to make the signal flow clear, the following description will be given with reference to FIGS. 11 and 12.

First, a data signal transmitted from a lower interface 27 passes the first switching means 211, is transformed into a signal having levels of '−1' and '+1' in the level transformer 212. Subsequently, a 100 Mbps Ethernet signal 1100, which is transformed into a signal having levels of '−1' and '+1', is branched into 16 parallel signals in the 1×16 serial/parallel converter 100. For example, a signal inputted as a reference number '1100' is converted into parallel signals as shown as a reference number '1200' by the serial/parallel converter 100. At this time, one-bit duration time of the parallel-converted signal is sixteen times as long as one-bit duration time of the serial signal.

Next, a signal of each bit, which is converted into parallel signals, is multiplied, in the multiplier 215, by a specific CDMA code assigned according to ONTs 21. For example, in the case of the sixteenth ONT, a 16-chip CDMA code of '+1, −1, −1, +1, −1, +1, +1, −1, −1, +1, +1, −1, +1, −1, −1, +1' 64 is assigned as shown in Table 1. In this case, a chip rate is 100 Mcps, which is sixteen times as fast as a parallel signal speed.

Herein, embodiments shown in FIG. 10*a*, 10*b*, and following drawings have a distinctive feature as compared to the embodiments of FIG. 5 to 9, in that all 16 chips of a CDMA code 64 are multiplied in the multiplier 215 in the case of embodiments of FIG. 10*a*, 10*b* and following drawings, while a corresponding chip 214 of a 16-chip CDMA code 64 is multiplied in the multiplier 215 in the case of embodiment of FIG. 5 to 9.

That is, each of parallel-converted signals 1200 is directly multiplied by all of an assigned CDMA code 64. As a result of this, spread spectrum signals of reference number '1300' can be obtained. The signals multiplied by the CDMA code 64 undergo an inverse Fourier transform in the IFFT 501 and transmitted to an OLT 23 through the same process as that described in the embodiment of FIGS. 5*a* and 5*b*.

Meanwhile, in the OLT 23, an upstream signal is divided by the WDM filter 231, thereby being received into the optical receiver 232. The received signal is branched into 16 signals through the branching filter 233, and each of the branched signals is divided into real components and imaginary components through the same process as that described in the embodiment of FIGS. 5*a* and 5*b*.

Subsequently, the divided real components 65 and imaginary components 66 are divided into parallel signals in the serial/parallel converter 512, and undergo a Fourier transform in the FFT 513. Each of the Fourier-transformed signals is multiplied, in the multiplier 238, by respective CDMA codes so as to detect signals transmitted from each ONT 21. For example, in a case of detecting data transmitted from the sixteenth ONT 21, the Fourier-transformed signal is multiplied by the CDMA code 64 (Code 16).

In the data discriminator 110, data transmitted from the ONT 21 are restored from the respective parallel signal components multiplied by the CDMA code 64, while having the same signal form as that represented as reference number '1200'. Subsequently, the restored data are converted into 100 Mbps Ethernet signals (output signals) through the parallel/serial converter 120, and then undergo the same process as that described in the embodiment of FIGS. 5*a* and 5*b*.

Figure 13A:
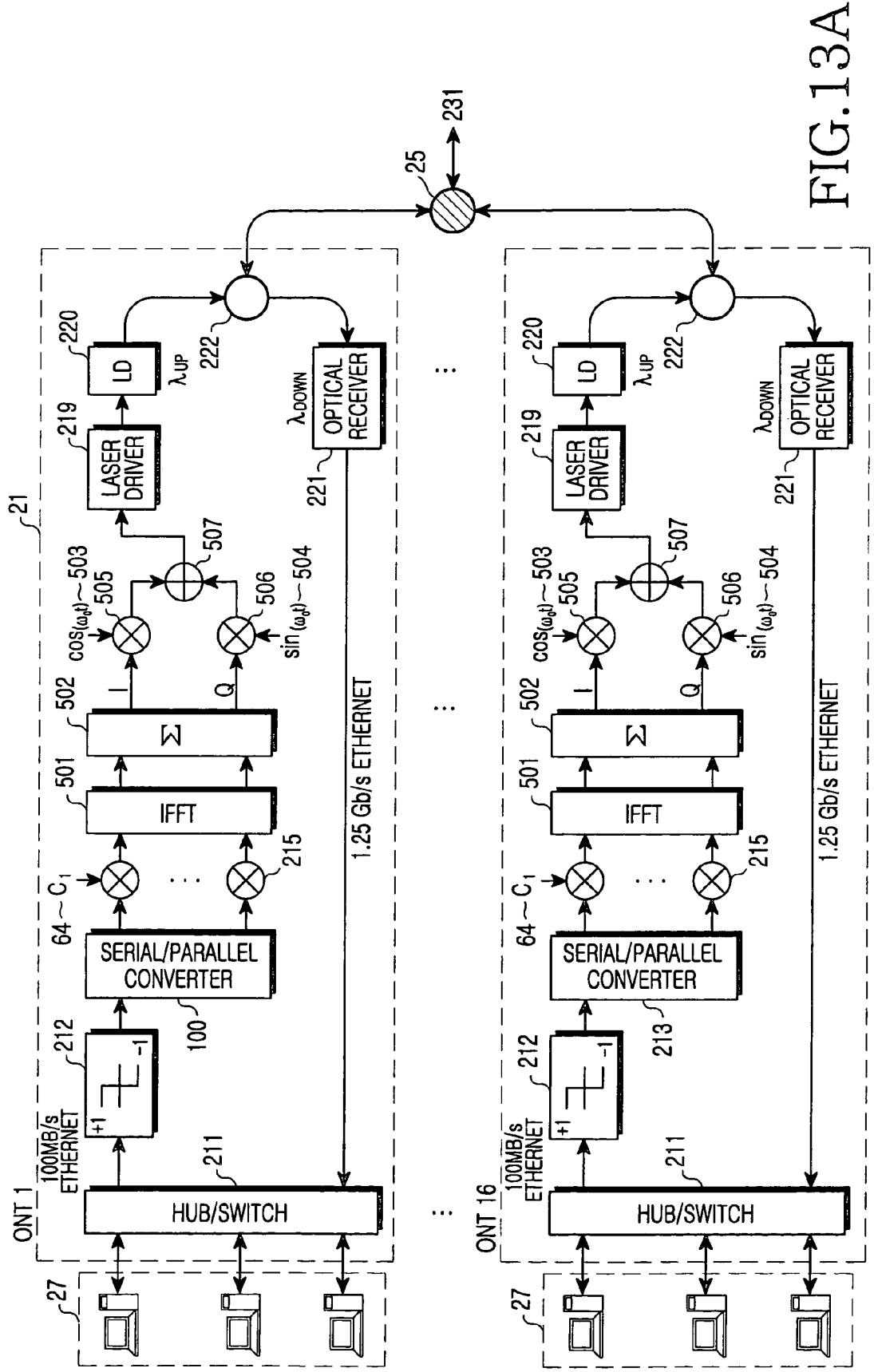
FIGS. 13a and 13b illustrate a second embodiment modified from the PON employing a multi-carrier CDMA shown in FIGS. 10a and 10b according to the present invention.
Figure 13B:
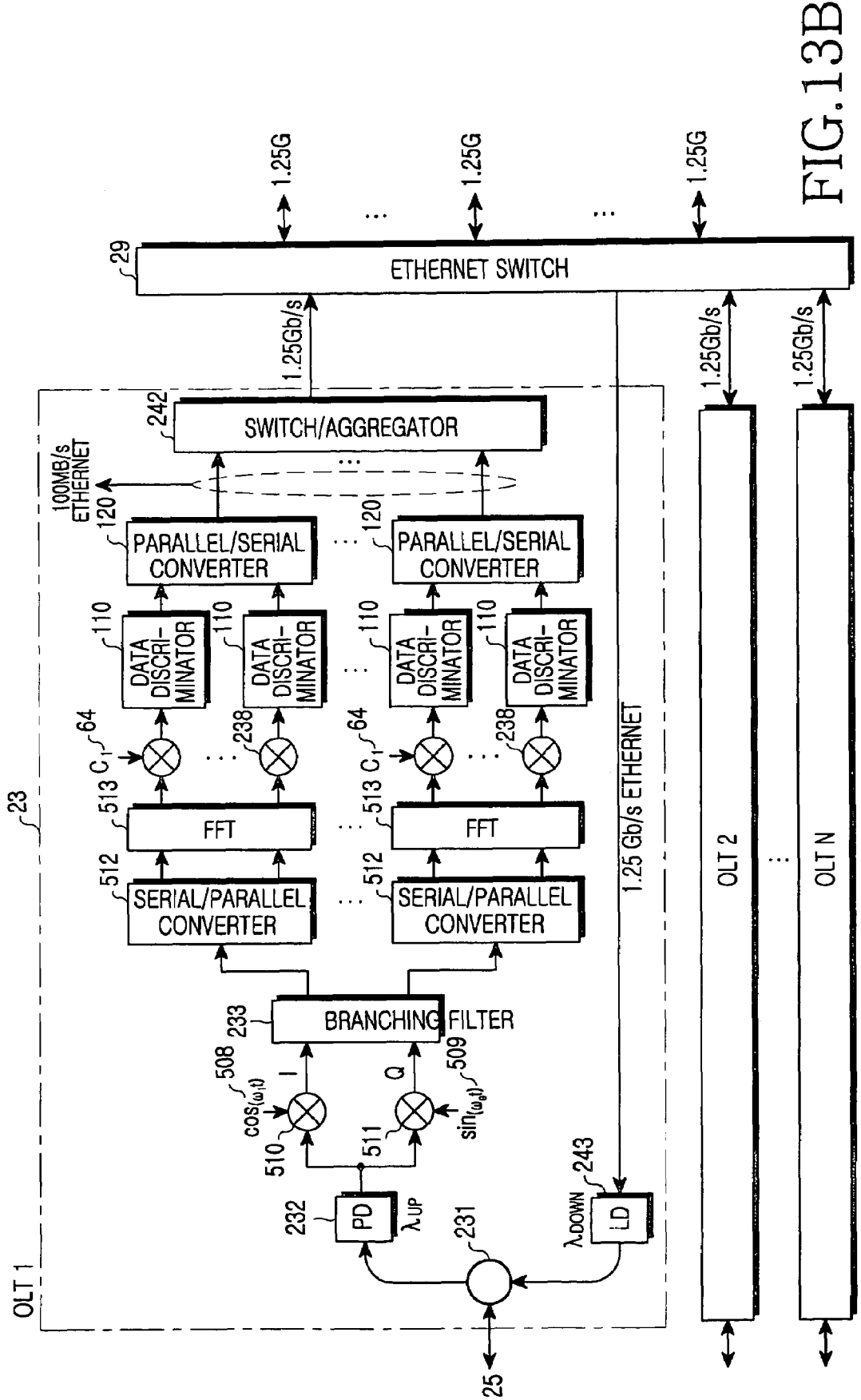

FIGS. 13*a* and 13*b* illustrate the construction of a second embodiment modified from the PON employing a multi-carrier CDMA shown in FIGS. 10*a* and 10*b* according to the present invention. Here, multipliers for dividing received signals into real components and imaginary components in an OLT are located at output part of an optical receiver.

The construction and operation of an ONT 21 shown in FIGS. 13*a* and 13*b* are identical with those of FIGS. 10*a* and 10*b*. To avoid redundancy, the following explanation will be given about the operation and characteristics of the OLT 23.

Upstream optical signals transmitted from each ONT 21 are inputted into the OLT 23 through the 1×16 optical coupler 25 and transmitted to the optical receiver 232 by the WDM filter 231 in the OLT 23. The signal converted into an electric signal by the optical receiver 232 is multiplied, in the multiplier 510, by a cosine carrier 508 having a frequency of f0, and is also multiplied, in the multiplier 511, by a sine carrier 509 so as to divide each signal into real components and imaginary components. Through this process, real components 65 and imaginary components 66 are detected.

The signals divided into the real component 65 and the imaginary component 66 are respectively branched into 16 signals in the 1×16 branching filter 233. Each of the branched real and imaginary signals is converted into parallel components X(0) to X(15) through the serial/parallel converter 512 and inputted into the FFT 513. Fourier-transformed signals through the FFT 513 are multiplied, in the multiplier 238, by the same assigned CDMA code 64 as in a corresponding ONT 21 so as to extract signal components transmitted from each ONT 21. Through this process, signal components transmitted from each ONT 21 are detected. From the detected signal components, 100 Mbps Ethernet signals transmitted from each ONT are restored in parallel by the data discriminator 110. Subsequently, all of the 100 Mbps Ethernet signals are outputted through the parallel/serial converter 120.

The restored 100 Mbps Ethernet signal is transformed into a 1.25 Gbps Ethernet signal in the second switching means 242 and transmitted to other OLTs 23 or connected to a higher network through an Ethernet switch 29.

Meanwhile, a 1.25 Gbps Ethernet signal transmitted from the Ethernet switch 29 to each ONT 21 is optical-modulated at an optical transmitter 243 in the OLT 23, passes a WDM filter 231 and a 1×16 optical coupler 25, and transmitted into each ONT 21.

Figure 14A:
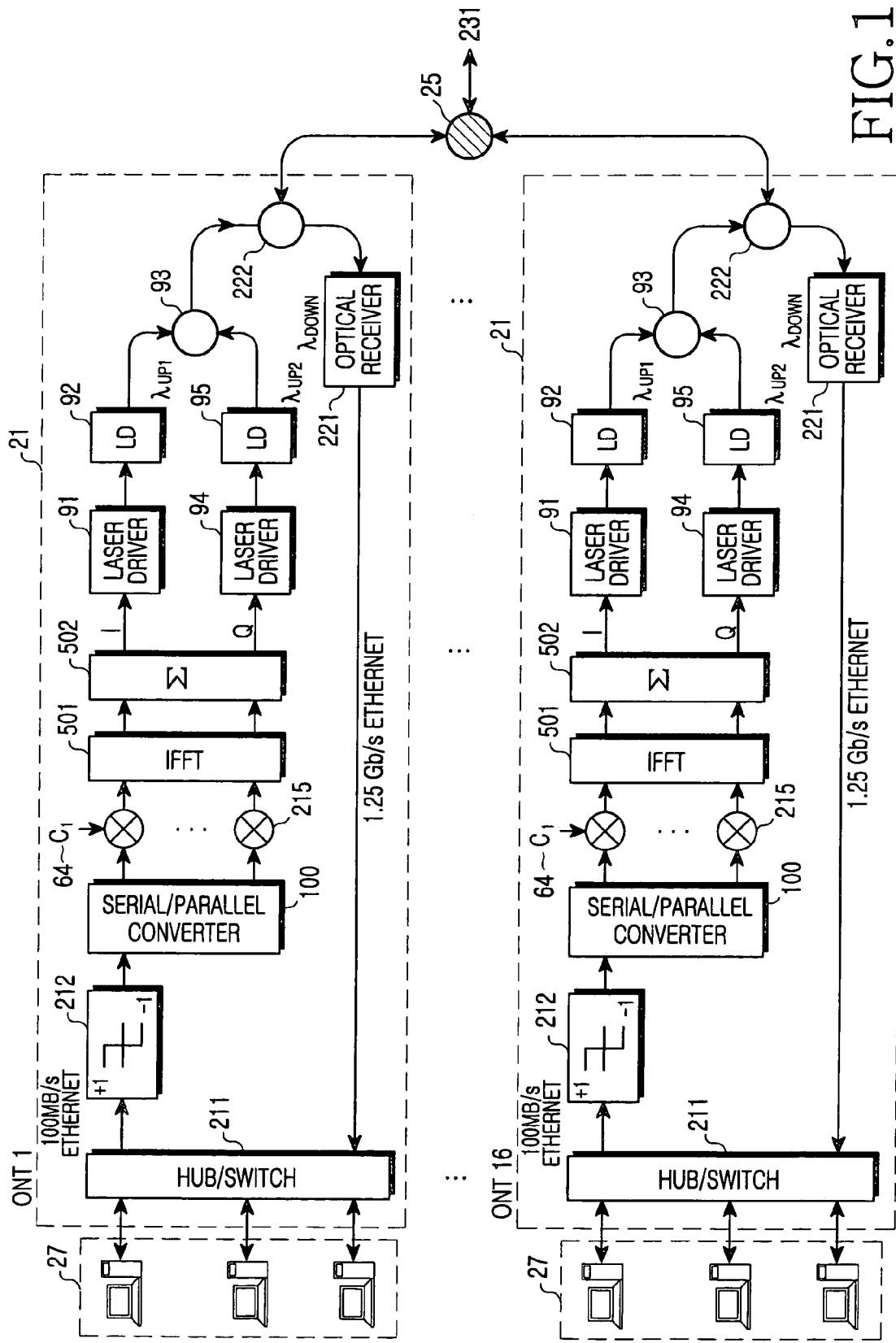
FIGS. 14a and 14b illustrate a third embodiment modified from the PON employing a multi-carrier CDMA shown in FIGS. 10a and 10b according to the present invention.
Figure 14B:
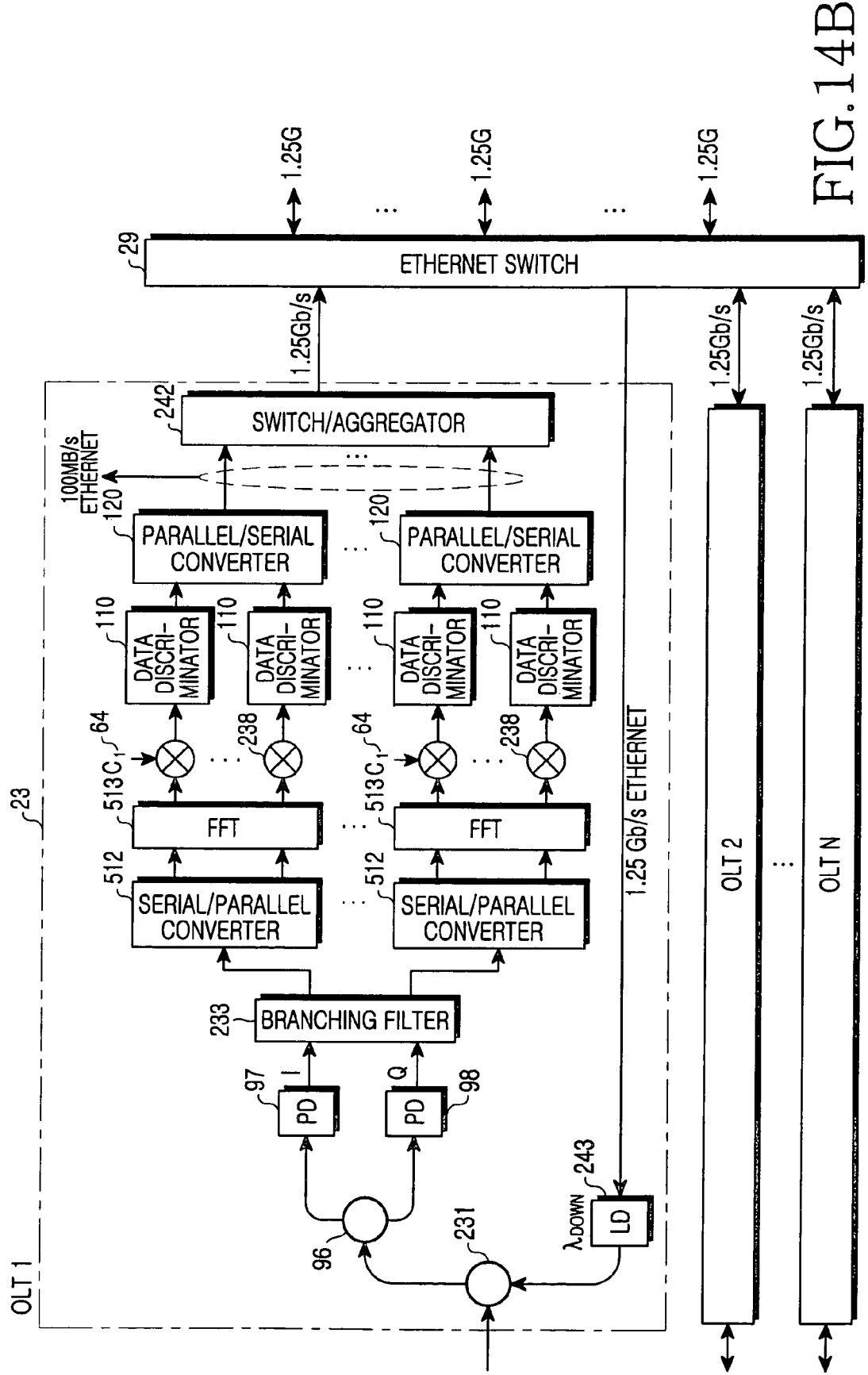

FIGS. 14*a* and 14*b* illustrate the construction of a third embodiment modified from the PON employing a multi-carrier CDMA shown in FIGS. 10*a* and 10*b* according to the present invention. The embodiment shown in FIGS. 14*a* and 14*b* is characteristic in that real components and imaginary components are respectively optical-modulated and transmitted, and also the optical-modulated components are received and modulated into electric signals.

The embodiment shown in FIGS. 14a and 14b is a third embodiment modified from the PON employing a multi-carrier CDMA shown in FIGS. 10a and 10b, comprises respective laser drivers 91 and 94 and respective laser diodes 92 and 95 in an ONT 21 for each of the real component and the imaginary component so as to optical-modulate each of the signal components, and further comprises an optical coupler 93 for coupling the signal components. Also, an OLT 23 according to this embodiment comprises an optical branching filter 96 for branching two wavelengths transmitted from the ONT 21, and also comprises optical receivers 97 and 98 for respectively receiving two kinds of optical signals, each of which includes one of the signal components, branched through the optical branching filter 96.

To be more specific, the embodiment shown in FIGS. 14a and 14b—unlike the embodiment shown in FIGS. 10a and 10b in which the ONT 21 and the OLT 23 use cosine carriers, sine carriers, and multipliers so as to divide real components and imaginary components of a transmitted signal—is characteristic in that an optical transmission section 91, 92 and 93 for transmitting real components and an optical transmission section 94, 95 and 93 for transmitting imaginary components are respectively comprised in an ONT 21, and each of the optical transmission sections uses different wavelengths from each other. That is, an optical signal including real components and an optical signal including imaginary components are coupled in an optical coupler 93, and are transmitted to the OLT 23. In the OLT 23, an upstream signal passes an optical branching filter 96 and inputted into optical receivers 97 and 98. At this time, the OLT 23 is characteristic of comprising an optical receiver 97 for detecting real components and an optical receiver 98 for detecting imaginary components respectively.

In the embodiment shown in FIGS. 14a and 14b, the others—with the exception of the above signal transmission/receipt process between the OLT 23 and the ONT 21—are the same as the embodiment shown in FIGS. 10a and 10b. In conclusion, the difference of the two embodiments is as follows: In the embodiment shown in FIGS. 14a and 14b, each of electrically-different real and imaginary components is modulated into an optical signal, the two modulated optical signals are added to each other, and the added optical signal is transmitted; in the embodiment shown in FIGS. 10a and 10b, electrically added real and imaginary components are first transmitted as an optical signal, and a received optical signal is divided into the real component and the imaginary component.

Figure 15:
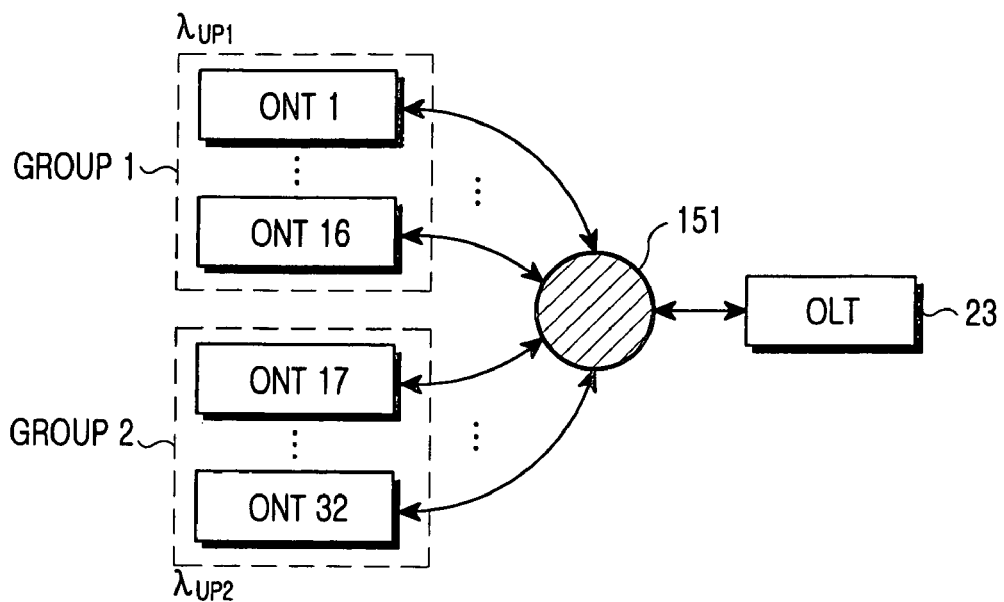
FIG. 15 illustrates an expanded embodiment so that a PON employing a multi-carrier CDMA according to the present invention accommodates 32 subscribers.

FIG. 15 is a construction view illustrating a PON for accommodating 32 subscribers. The embodiment shown in FIG. 15 comprises 32 number of ONTs 21, an OLT 23, and a 1×32 optical coupler 151. Herein, the ONTs 21 are classified into two groups and use different wavelengths from each other according to groups. The detailed construction and operation of the ONT 21 and the OLT 23 are identical to those described above, thus not explained to avoid redundancy.

Figure 16:
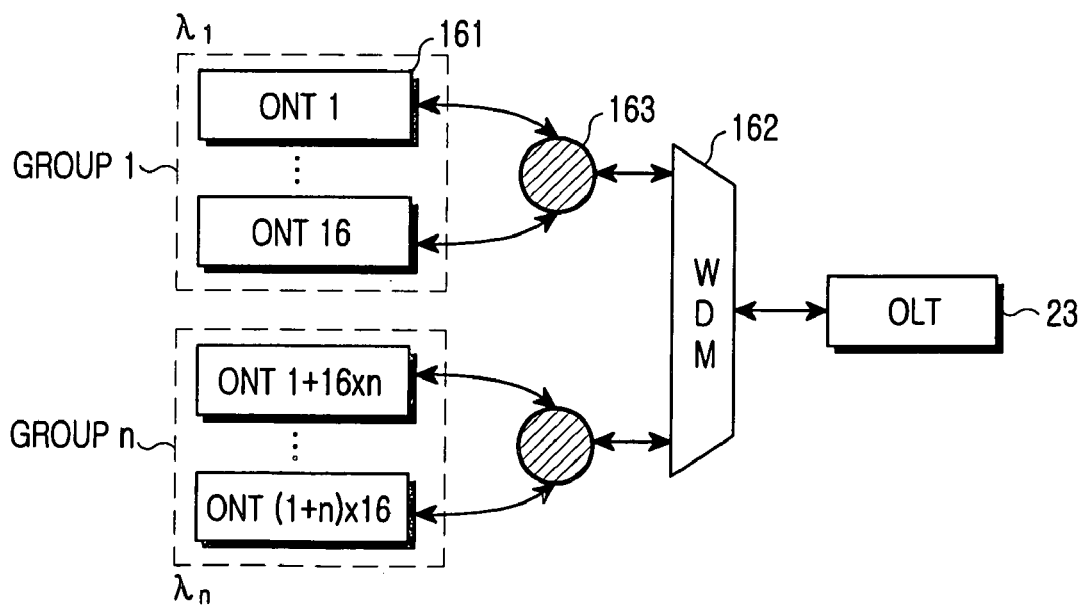
FIG. 16 illustrates an embodiment in which a PON employing a multi-carrier CDMA according to the present invention is applied to a WDM.

FIG. 16 is a construction view in which a PON according to the present invention is connected with a WDM-PON, and includes ONT groups 161 using different wavelengths from each other, an OLT 23, a wavelength multiplexing/demultiplexing device 162, and optical couplers 163. Each of the ONT groups 161 comprises sixteen ONTs. Also, the OLT 23 comprises CDMA-receipt blocks for receiving signals according to wavelengths. The others of construction and operation of the embodiment shown in FIG. 16 are the same as those described in other embodiments, thus not explained to avoid redundancy.

As described above, the PON according to the present invention, unlike the conventional PON, adopts the CDMA method as an upstream transmission method, so that it is not necessary to use the complicated MAC protocol requested as in prior art. Therefore, the PON according to the present invention enables the ONTs to maintain a state capable of transmitting data at all times, thereby guaranteeing a wide upstream transmission bandwidth of 100 Mbps at all times, unlike the prior art.

Also, since the PON according to the present invention employs a multi-carrier CDMA, only a simple electronic circuit capable of handling about 100 Mbps of data is required. Therefore, the PON according to the present invention has effects of simplifying complicated signal processes in a transmitter and a receiver and efficiently solving a synchronization problem.

Further, the PON according to the present invention can henceforth be efficiently applied to large-scale subscriber networks and can be excellently applied to WDM-PONs generally recognized as an ideal structure for optical subscriber network.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A passive optical network (PON) employing a multi-carrier CDMA, comprising:
    a plurality of optical network terminals (ONTs) configured to receive an Ethernet signal from an outer lower interface device, to transmit CDMA-based signals to an optical line terminal (OLT) using multiple carriers and to receive an Ethernet-based signal transmitted from the OLT;
    the OLT configured to transform each CDMA-based signal received from the respective ONT into a transformed Ethernet-based signal, to transmit the transformed Ethernet-based signal to a higher network, and to transmit the Ethernet-based signal to the ONTs; and
    an optical coupler configured to couple the CDMA-based signals transmitted from the plurality of ONTs, to transmit the coupled CDMA-based signals to the OLT, and to distribute the Ethernet-based signal transmitted from the OLT to the plurality of ONTs,
    wherein each ONT comprises
    a level transformer configured to transform a 100 Mbps Ethernet signal received from the outer lower interface device into a level-transformed signal with predetermined data level values;
    a first multiplexer being configured to branch the level-transformed signal into branched signal; and
    a first multiplier configured to multiply each one of the branched signals with a CDMA code assigned to one of the ONTs and to output multiplied, branched signals.

2. A passive optical network (PON) employing CDMA as claimed in claim 1, wherein the each of ONTs comprises:
    a first switching means being coupled to the outer lower interface device and being configured to output the Ethernet signal to the level transformer;
    a second multiplier configured to multiply the multiplied, branched signals output from the first multiplier with a plurality of carriers;

a first coupler configured to couple the signals multiplied with the plurality of carriers;

a first optical transmission section configured to optically modulate a signal output from the first coupler and to transmit the optically modulated signal to the OLT;

a first optical receiver configured to receive the signal transmitted from the OLT and to transmit the signal received from the OLT to the first switching means; and a first wavelength division multiplexing (WDM) filter configured to divide an upstream signal and an downstream signal.

3. A passive optical network (PON) employing CDMA as claimed in claim 2, wherein the first optical transmission section comprises:

a laser driver configured to control a laser drive current of the signal output from the first coupler; and a laser diode configured to optically modulate the signal inputted through the laser driver and to transmit the optically modulated signal to the OLT.

4. A passive optical network (PON) employing CDMA as claimed in claim 1, wherein the OLT comprises:

a second WDM filter configured to divide upstream signal and downstream signal;

a second optical receiver configured to receive an optical signal transmitted from the ONT;

a first branching filter configured to branch the received optical signal into branched optical signals;

a second branching filter configured to re-branch one of the branched signals into re-branched optical signals;

a third multiplier configured to multiply and demodulate one of the re-branched optical signals using a carrier;

a fourth multiplier configured to multiply the signals multiplied and demodulated by the third multiplier with a CDMA code assigned to one of the ONTs;

a low-pass filter configured to remove a high-frequency-band signals from the signals outputted from the fourth multiplier;

a second coupler being coupled to the low-pass filter;

data discriminators configured to discriminate a 100 Mbps Ethernet signal of the signals output from the second coupler;

a second switching means configured to transform the 100 Mbps Ethernet signals outputted through the data discriminators into a 1.25 Gbps Ethernet signals; and a second optical transmission section configured to transmit the 1.25 Gbps Ethernet signal in the downstream direction.

5. A passive optical network (PON) employing CDMA as claimed in claim 1, wherein each of the ONTs comprises:

a first switching means coupled to an outer lower interface device;

an IFFT section configured to perform an inverse Fourier Transform on each of the branched multiplied, branched signals;

a first coupler being configured to couple the inverse-Fourier-transformed signals;

a second multiplier configured to multiply real components of the signal output from the first coupler by a cosine carrier;

a third multiplier configured to multiply imaginary components of the signal output from the first coupler by a sine carrier;

an adder configured to add the real components and the imaginary components multiplied by the second and the third multiplier;

a first optical transmission section configured to optically modulate a signal output from the adder and to transmit the optically modulated signal to the OLT;

a first optical receiver configured to receive a signal transmitted from the OLT and to transmit the signal received from the OLT to the first switching means; and a first wavelength division multiplexing (WDM) filter configured to divide upstream signal and downstream signal.

6. A passive optical network (PON) employing CDMA as claimed in claim 5, wherein the first optical transmission section comprises:

a laser driver configured to control laser drive current of the signal output from the first coupler; and a laser diode configured to optically modulate the signal inputted through the laser driver and to transmit the optically modulated signal to the OLT.

7. A passive optical network (PON) employing CDMA as claimed in claim 5, wherein the OLT comprises:

a second WDM filter configured to divide an upstream signal and a downstream signal;

a second optical receiver configured to receive an optical signal transmitted from the ONT and configured to convert the optical signal received from the ONT into an electrical signal;

a branching filter configured to branch a converted electric signal into branched signals;

a fourth multiplier configured to multiply one of the branched signals with a cosine carrier and to detect a real components of one the branched signals;

a fifth multiplier configured to multiply another one of the branched signals by a sine carrier and to detect an imaginary components of another one of the branched signals;

a serial/parallel converter configured to perform a serial/parallel conversion on each one the signals outputted from the fourth and the fifth multiplier and to output signals in parallel;

an FFT section configured to perform a high-speed Fourier Transform on the signals outputted in parallel through the serial/parallel converter;

a sixth multiplier configured to multiply the high-speed Fourier-transformed signal with a CDMA code chip assigned to one of the ONTs;

a second coupler being coupled to the sixth multiplier;

data discriminators configured to discriminate the 100 Mbps Ethernet data output from the second coupler;

a second switching means configured to transform the 100 Mbps Ethernet signals outputted from the data discriminators into 1.25 Gbps Ethernet signals; and a second optical transmission section configured to transmit the 1.25 Gbps Ethernet signal in the downstream direction.

8. A passive optical network (PON) employing CDMA as claimed in claim 5, wherein the OLT comprises:

a second WDM filter configured to divide upstream wavelengths and downstream wavelengths;

a second optical receiver configured to receive an optical signal transmitted from the ONT and configured to converting the received optical signal into an electrical signal;

a fourth multiplier configured to multiply a signal converted into an electrical signal through the second optical receiver by a cosine carrier to detect real components;

a fifth multiplier configured to multiply a signal converted into an electrical signal through the second optical receiver by a sine carrier to detect imaginary components;

a branching filter configured to respectively branch real components and imaginary components detected through the fourth and the fifth multiplier;

a serial/parallel converter configured to perform a serial/parallel conversion on the signals outputted from the branching filter to output signals in parallel;

an FFT section configured to perform a high-speed Fourier Transform on the signals outputted in parallel through the serial/parallel converter;

a sixth multiplier configured to multiply the high-speed Fourier-transformed signal by a CDMA code chip assigned to each of the ONTs; a second coupler configured to couple the signals outputted through the sixth multiplier;

data discriminators configured to discriminate 100 Mbps Ethernet data of the coupled signal;

a second switching means configured to transform the 100 Mbps Ethernet signals outputted through the data discriminators into 1.25 Gbps Ethernet signals; and a second optical transmission section configured to transmit the 1.25 Gbps Ethernet signal in the downstream direction.

9. A passive optical network (PON) employing CDMA as claimed in claim 1, wherein each of the ONTs comprises:

a first switching means coupled to an outer lower interface device;

an IFFT section configured to perform a high-speed inverse Fourier Transform on each of the branched signals endowed with a CDMA code through the first multiplier;

a first coupler configured to couple the high-speed inverse-Fourier-transformed signals;

a first optical transmission section configured to optically modulate real components of the signal coupled through the first coupler;

a second optical transmission section configured to optically modulate imaginary components of the signal coupled through the first coupler;

an optical coupler configured to add the real components and the imaginary components outputted from the first and the second optical transmission section and to transmit the added signals to the OLT;

a first optical receipt section configured to receive a signal transmitted from the OLT and transmitting the received signal to the first switching means; and a first wavelength division multiplexing (WDM) filter configured to divide upstream wavelengths and downstream wavelengths of the ONT.

10. A passive optical network (PON) employing CDMA as claimed in claim 9, wherein each of the first and the second optical transmission section comprises:

a laser driver configured to control laser drive current of the signal coupled through the first coupler; and a laser diode configured to optical-modulate the signal coupled through the first coupler and to transmit the optical-modulated signal to the OLT.

11. A passive optical network (PON) employing CDMA as claimed in claim 10, wherein the OLT comprises:

a second WDM filter configured to divide upstream wavelengths and downstream wavelengths;

an optical branching filter configured to receive an optical signal transmitted from the ONT and to branch the received optical signal;

a second optical receiver configured to convert real components of an optical signal branched through the optical branching filter into an electrical signal;

a third optical receiver configured to convert imaginary components of an optical signal branched through the optical branching filter into an electrical signal;

a branching filter configured to respectively branch real components and imaginary components converted into an electrical signal through the second and the third optical receiver;

a serial/parallel converter configured to perform a serial/parallel conversion on the signals outputted from the branching filter to output signals in parallel;

an FFT section configured to perform a high-speed Fourier Transform on the signals outputted in parallel through the serial/parallel converter;

a second multiplier configured to multiply the high-speed Fourier-transformed signal by each chip of a CDMA code assigned to each of the ONTs;

a second coupler configured to couple the signals outputted through the second multiplier;

data discriminators configured to discriminate 100 Mbps Ethernet data of the coupled signal;

a second switching means configured to transform the 100 Mbps Ethernet signals outputted through the data discriminators into 1.25 Gbps Ethernet signals; and a second optical transmission section configured to transmit the 1.25 Gbps Ethernet signal in the downstream direction.

12. A passive optical network (PON) employing CDMA as claimed in claim 9, wherein the OLT comprises:

a second WDM filter configured to divide upstream wavelengths and downstream wavelengths;

an optical branching filter configured to receive an optical signal transmitted from the ONT and to branch the received optical signal;

a second optical receiver configured to convert real components of an optical signal branched through the optical branching filter into an electrical signal;

a third optical receiver configured to convert imaginary components of an optical signal branched through the optical branching filter into an electrical signal;

a branching filter configured to respectively branch real components and imaginary components converted into an electrical signal through the second and the third optical receiver;

a serial/parallel converter configured to perform a serial/parallel conversion on the signals outputted from the branching filter to output signals in parallel;

an FFT section configured to perform a high-speed Fourier Transform on the signals outputted in parallel through the serial/parallel converter;

a second multiplier configured to multiply the high-speed Fourier-transformed signal by each chip of a CDMA code assigned to each of the ONTs;

a second coupler configured to couple the signals outputted through the second multiplier;

data discriminators configured to discriminate 100 Mbps Ethernet data of the coupled signal;

a second switching means configured to transform the 100 Mbps Ethernet signals outputted through the data discriminators into 1.25 Gbps Ethernet signals; and a second optical transmission section configured to transmit the 1.25 Gbps Ethernet signal in the downstream direction.

13. A passive optical network (PON) employing a multi-carrier CDMA, comprising:
a plurality of optical network terminals (ONTs) configured to receive an Ethernet signal from an outer lower interface device, to transmit CDMA-based signals to an optical line terminal (OLT) using multiple carriers, and to receive an Ethernet-based signal transmitted from the OLT;
the OLT configured to transform each CDMA-based signal received from the respective ONT into a transformed Ethernet-based signal, to transmit the transformed Ethernet-based signal to a higher network, and to transmit the Ethernet-based signal to the ONTs; and
an optical coupler configured to couple the CDMA-based signals transmitted from the plurality of ONTs, to transmit the coupled CDMA-based signals to the OLT, and to distribute the Ethernet-based signal transmitted from the OLT to the plurality of ONTs,
wherein each ONT comprises:
a level transformer configured to transform a 100 Mbps Ethernet signal received from the outer lower interface device into a level-transformed signal with predetermined data level values;
a serial/parallel converter configured to convert the level-transformed signal into parallel signals; and
a first multiplier configured to multiply each one of the parallel signals by a CDMA code assigned to each ONT.

14. A passive optical network (PON) employing CDMA as claimed in claim 13, wherein each of the ONTs comprises:
a first switching means coupled to an outer lower interface device;
an IFFT section configured to perform an inverse Fourier Transform on each of the parallel signals endowed with a CDMA code through the first multiplier;
a first coupler configured to couple the inverse-Fourier-transformed signals;
a second multiplier configured to multiply real components of the signal coupled through the first coupler by a cosine carrier;
a third multiplier configured to multiply imaginary components of the signal coupled through the first coupler by a sine carrier;
an adder configured to add real and imaginary components outputted from the second and the third multiplier;
a first optical transmission section configured to optically modulate the signal of the real and the imaginary components added through the adder and to transmit the optically modulated signal to the OLT;
a first optical receipt section configured to receive a signal transmitted from the OLT and configured to transmitting the received signal to the first switching means; and
a first wavelength division multiplexing (WDM) filter configured to divide upstream wavelengths and downstream wavelengths of the ONT.

15. A passive optical network (PON) employing CDMA as claimed in claim 14, wherein each of the optical transmission section comprises:
a laser driver configured to control laser drive current of the signal coupled through the first coupler; and
a laser diode configured to optical-modulate a signal and transmitting the optical-modulated signal to the OLT.

16. A passive optical network (PON) employing CDMA as claimed in claim 14, wherein the OLT comprises:
a second WDM filter configured to divide upstream wavelengths and downstream wavelengths;
a second optical receiver configured to receive an optical signal transmitted from the ONT and to convert the received optical signal into an electrical signal;
a fourth multiplier configured to multiply a signal converted into an electrical signal through the second optical receiver by a cosine carrier to detect real components;
a fifth multiplier configured to multiply a signal converted into an electrical signal through the second optical receiver by a sine carrier to detect imaginary components;
a branching filter configured to respectively branch real components and imaginary components detected through the fourth and the fifth multiplier;
a serial/parallel converter configured to perform a serial/parallel conversion on the signals outputted from the branching filter to output signals in parallel;
an FFT section configured to perform a high-speed Fourier Transform on the signals outputted in parallel through the serial/parallel converter;
a sixth multiplier configured to multiply the high-speed Fourier-transformed signal by a CDMA code assigned to each of the ONTs;
data discriminators configured to discriminate 100 Mbps Ethernet data of signals outputted through the sixth multiplier;
a parallel/serial converter configured to couple signals outputted through the data discriminators to output 100 Mbps Ethernet signals in series;
a second switching means configured to transform the 100 Mbps Ethernet signals outputted through the data discriminators into 1.25 Gbps Ethernet signals; and
a second optical transmission section configured to transmit the 1.25 Gbps Ethernet signal in the downstream direction.

17. A passive optical network (PON) employing CDMA as claimed in claim 13, wherein the OLT comprises:
a second WDM filter configured to divide upstream wavelengths and downstream wavelengths;
a second optical receiver configured to receive an optical signal transmitted from the ONT and configured to convert the received optical signal into an electrical signal;
a branching filter configured to branch the converted electrical signal;
a fourth multiplier configured to multiply each of the branched signals by a cosine carrier to detect real components;
a fifth multiplier configured to multiply each of the branched signals by a sine carrier to detect imaginary components;
a serial/parallel converter configured to perform a serial/parallel conversion on signals outputted from the fourth and the fifth multiplier and configured to output signals in parallel;
an FFT section configured to perform a high-speed Fourier Transform on the signals outputted in parallel through the serial/parallel converter;
a sixth multiplier configured to multiply the high-speed Fourier-transformed signal by a CDMA code assigned to each of the ONTs;

data discriminators configured to discriminate 100 Mbps Ethernet data of signals outputted through the sixth multiplier;
a parallel/serial converter configured to couple signals outputted through the data discriminators to output 100 Mbps Ethernet signals in series;
a second switching means configured to transform the 100 Mbps Ethernet signals outputted through the data discriminators into 1.25 Gbps Ethernet signals; and
a second optical transmission section configured to transmit the 1.25 Gbps Ethernet signal in the downstream direction.

18. A passive optical network (PON) employing CDMA as claimed in claim 13, wherein each of the ONTs comprises:
a first switching means coupled to an outer lower interface device;
an IFFT section configured to perform an inverse Fourier Transform on each of the parallel signals endowed with a CDMA code through the first multiplier;
a first coupler configured to couple the inverse-Fourier-transformed signals;
a first optical transmission section configured to optically modulate real components of the signal coupled through the first coupler;
a second optical transmission section configured to optically modulate imaginary components of the signal coupled through the first coupler;
an optical coupler configured to add the real components and the imaginary components outputted from the first and the second optical transmission section and to transmit the added signals to the OLT;
a first optical receipt section configured to receive a signal transmitted from the OLT and configured to transmit the received signal to the first switching means; and
a first wavelength division multiplexing (WDM) filter configured to divide upstream wavelengths and downstream wavelengths of the ONT.

19. A passive optical network (PON) employing CDMA as claimed in claim 18, wherein each of the first and the second optical transmission section comprises:
a laser driver configured to control laser drive current of the signal coupled through the first coupler; and
a laser diode configured to optical-modulate the signal coupled through the first coupler and configured to transmit the optical-modulated signal to the OLT.

20. A passive optical network (PON) employing CDMA as claimed in claim 18, wherein the OLT comprises:
a second WDM filter configured to divide upstream wavelengths and downstream wavelengths;
an optical branching filter configured to receive an optical signal transmitted from the ONT and to branching the received optical signal according to components;
a second optical receiver configured to convert real components of an optical signal branched through the optical branching filter into an electrical signal;
a third optical receiver configured to convert imaginary components of an optical signal branched through the optical branching filter into an electrical signal;
a branching filter configured to respectively branch real components and imaginary components converted into an electrical signal through the second and the third optical receiver;
a serial/parallel converter configured to perform a serial/parallel conversion on the signals outputted from the branching filter to output signals in parallel;
an FFT section configured to perform a high-speed Fourier Transform on the signals outputted in parallel through the serial/parallel converter;
a sixth multiplier configured to multiply the high-speed Fourier-transformed signal by a CDMA code assigned to each of the ONTs;
data discriminators configured to discriminate 100 Mbps Ethernet data of signals outputted through the sixth multiplier;
a parallel/serial converter configured to couple signals outputted through the data discriminators to output 100 Mbps Ethernet signals in series;
a second switching means configured to transform the 100 Mbps Ethernet signals outputted through the data discriminators into 1.25 Gbps Ethernet signals; and
a second optical transmission section configured to transmit the 1.25 Gbps Ethernet signal in the downstream direction.

* * * * *